United States Patent
Leung

(10) Patent No.: US 10,013,495 B2
(45) Date of Patent: Jul. 3, 2018

(54) INTRA-AFFILIATION AND INTER-AFFILIATION POSTINGS MANAGEMENT

(71) Applicant: UpBreeze Incorporated Limited, Kwun Tong (HK)

(72) Inventor: Hong C. Leung, Kwun Tong (HK)

(73) Assignee: UpBreeze Incorporated Limited, Kwun Tong (HK)

( * ) Notice: Subject to any disclaimer, the term of this patent is extended or adjusted under 35 U.S.C. 154(b) by 396 days.

(21) Appl. No.: 14/738,476

(22) Filed: Jun. 12, 2015

(65) Prior Publication Data

US 2015/0363497 A1    Dec. 17, 2015

Related U.S. Application Data

(60) Provisional application No. 62/012,252, filed on Jun. 13, 2014.

(51) Int. Cl.
*G06F 17/30* (2006.01)

(52) U.S. Cl.
CPC .............. *G06F 17/30867* (2013.01)

(58) Field of Classification Search
CPC .......... G06F 17/30867; G06F 17/3053; G06F 17/30958; G06F 17/30477; G06F 17/30
See application file for complete search history.

(56) References Cited

U.S. PATENT DOCUMENTS

| | | | | |
|---|---|---|---|---|
| 6,876,977 | B1 * | 4/2005 | Marks | G06Q 30/06 705/26.62 |
| 7,330,971 | B1 * | 2/2008 | Kukreja | H04L 63/083 709/203 |
| 7,730,014 | B2 * | 6/2010 | Hartenstein | G06Q 10/109 705/7.19 |
| 2003/0225689 | A1 * | 12/2003 | MacFarlane | G06Q 20/06 705/39 |
| 2003/0236977 | A1 * | 12/2003 | Levas | G06F 21/33 713/158 |
| 2004/0230601 | A1 * | 11/2004 | Joao | G06Q 10/08 707/E17.004 |
| 2005/0192822 | A1 * | 9/2005 | Hartenstein | G06Q 10/109 705/319 |
| 2005/0203824 | A1 * | 9/2005 | Freud | G06Q 30/08 705/37 |

(Continued)

*Primary Examiner* — Anh Ly
(74) *Attorney, Agent, or Firm* — Invoke

(57) ABSTRACT

Techniques for managing intra-affiliation and inter-affiliation postings are described. Disclosed are techniques for receiving a posting from an account, the account being associated with an affiliation and an account parameter, transmitting one or more affiliation-specific parameters associated with the affiliation to the account, receiving a posting parameter from the account, the posting parameter being selected from one or more affiliation-specific parameters, determining a level of relevancy of the posting to a receiving account based on the posting parameter, the account parameter, and a receiving account parameter, the receiving account being associated with the receiving account parameter, generating an order of postings based on the level of relevancy, and transmitting the order of postings to the receiving account. One or more postings may be displayed at the receiving account based on the order.

19 Claims, 21 Drawing Sheets

(56) References Cited

U.S. PATENT DOCUMENTS

| | | | |
|---|---|---|---|
| 2006/0116918 A1* | 6/2006 | Flora | G06Q 10/063116 705/7.19 |
| 2006/0235713 A1* | 10/2006 | Tobler | G06Q 30/0279 705/1.1 |
| 2008/0033739 A1* | 2/2008 | Zuckerberg | G06Q 10/10 705/319 |
| 2008/0065514 A1* | 3/2008 | Eaton | G06Q 10/087 705/26.3 |
| 2008/0270538 A1* | 10/2008 | Garg | G06Q 10/10 709/204 |
| 2009/0292641 A1* | 11/2009 | Weiss | G06F 21/32 705/66 |
| 2011/0125891 A1* | 5/2011 | Kawai | F24F 11/006 709/223 |
| 2011/0238755 A1* | 9/2011 | Khan | G06Q 50/01 709/204 |
| 2012/0054135 A1* | 3/2012 | Salaka | G06Q 10/107 706/13 |
| 2012/0223951 A1* | 9/2012 | Dunn | G06Q 10/10 345/467 |
| 2013/0086641 A1* | 4/2013 | Mehr | G06F 21/552 726/4 |
| 2013/0103436 A1* | 4/2013 | Torkelson | G06Q 50/26 705/5 |
| 2013/0191892 A1* | 7/2013 | Cadden | H04L 63/12 726/5 |
| 2013/0198290 A1* | 8/2013 | Thomas | H04L 12/1822 709/205 |
| 2013/0268444 A1* | 10/2013 | Namgoong | G06Q 20/40145 705/71 |
| 2014/0032914 A1* | 1/2014 | Foygel | H04L 63/083 713/176 |
| 2014/0142984 A1* | 5/2014 | Wright | G06F 19/321 705/3 |
| 2015/0052009 A1* | 2/2015 | Ketchell, III | G06Q 30/0633 705/26.8 |
| 2015/0127565 A1* | 5/2015 | Chevalier | G06Q 10/00 705/319 |
| 2015/0264093 A1* | 9/2015 | Madisch | H04L 65/403 715/753 |
| 2016/0150089 A1* | 5/2016 | Garg | H04M 7/003 370/352 |

* cited by examiner

| Initiating Posting Data 651 | Recipient Data 652 | Weight, if Match 670 |
|---|---|---|
| Posting Characteristic, Course | Recipient Characteristic, Course | 10 |
| Posting Characteristic, Subject Area | Recipient Characteristic, Subject Area | 8 |
| Posting Secondary Characteristic, Subject Area | Recipient Characteristic, Subject Area | 5 |
| Posting Characteristic, Course | Recipient Account Activity: Initiating Posting, Course | 7 |
| Posting Characteristic, Course | Recipient Account Activity: Responding Posting, Course | 8 |

| Initiator Data 753 | Recipient Data 754 | Weight, if Match 771 |
|---|---|---|
| Initiator Characteristic, Subject Area, Major | Recipient Characteristic, Subject Area, Major | 8 |
| Initiator Characteristic, Subject Area, Major | Recipient Characteristic, Subject Area, Minor | 6 |
| Initiator Characteristic Subject Area, Minor | Recipient Characteristic, Subject Area, Major | 5 |

701

| Other 851 | Weight 870 |
|---|---|
| Posting Characteristic, Date | Depends on how new |
| Initiator Account Activity: Number of Initiating Postings | Depends on how many |

800

INTRA-AFFILIATION AND INTER-AFFILIATION POSTINGS MANAGEMENT

FIELD

Various embodiments relate generally to computer software, web services, and networked communications. More specifically, techniques for intra-affiliation and inter-affiliation postings management are described.

BACKGROUND

Conventionally, forums, social networks, and other network and online services enable users to transmit and receive information electronically. However, users may need to manually filter through numerous messages in order to determine which are relevant to them. When users of one affiliation communicate with users of another affiliation, these communications typically refer to related or similar topics using different names. This decreases the likelihood that a posted message from a user of a different affiliation referring to a topic of interest by a different name is delivered to an intended user, which is problematic.

Further, such conventional services typically do not verify or authenticate the identity or affiliation of users, or use a lengthy or drawn-out registration process that is time-consuming or inefficient to complete.

Thus, what is needed is a solution for managing messages and topic correlations without the limitations of conventional techniques.

BRIEF DESCRIPTION OF THE DRAWINGS

Various embodiments or examples ("examples") are disclosed in the following detailed description and the accompanying drawings:

FIG. 6 illustrates an example of data evaluation by a posting ordering module of an intra-affiliation and inter-affiliation posting manager;

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in any arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a module or sub-component of another application. The described techniques may be implemented in software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex, Java, Javascript, Ajax, COBOL, Fortran, ADA, XML, HTML, DHTML, XHTML, HTTP, XMPP, Perl, machine assembly, Python, Ruby on Rails, and others. Design, publishing, and other types of applications such as Dreamware, Shockwave, Flash, and Fireworks may also be used to implement the described techniques. The described techniques may be varied and are not limited to the examples or descriptions provided.

Figure 1:
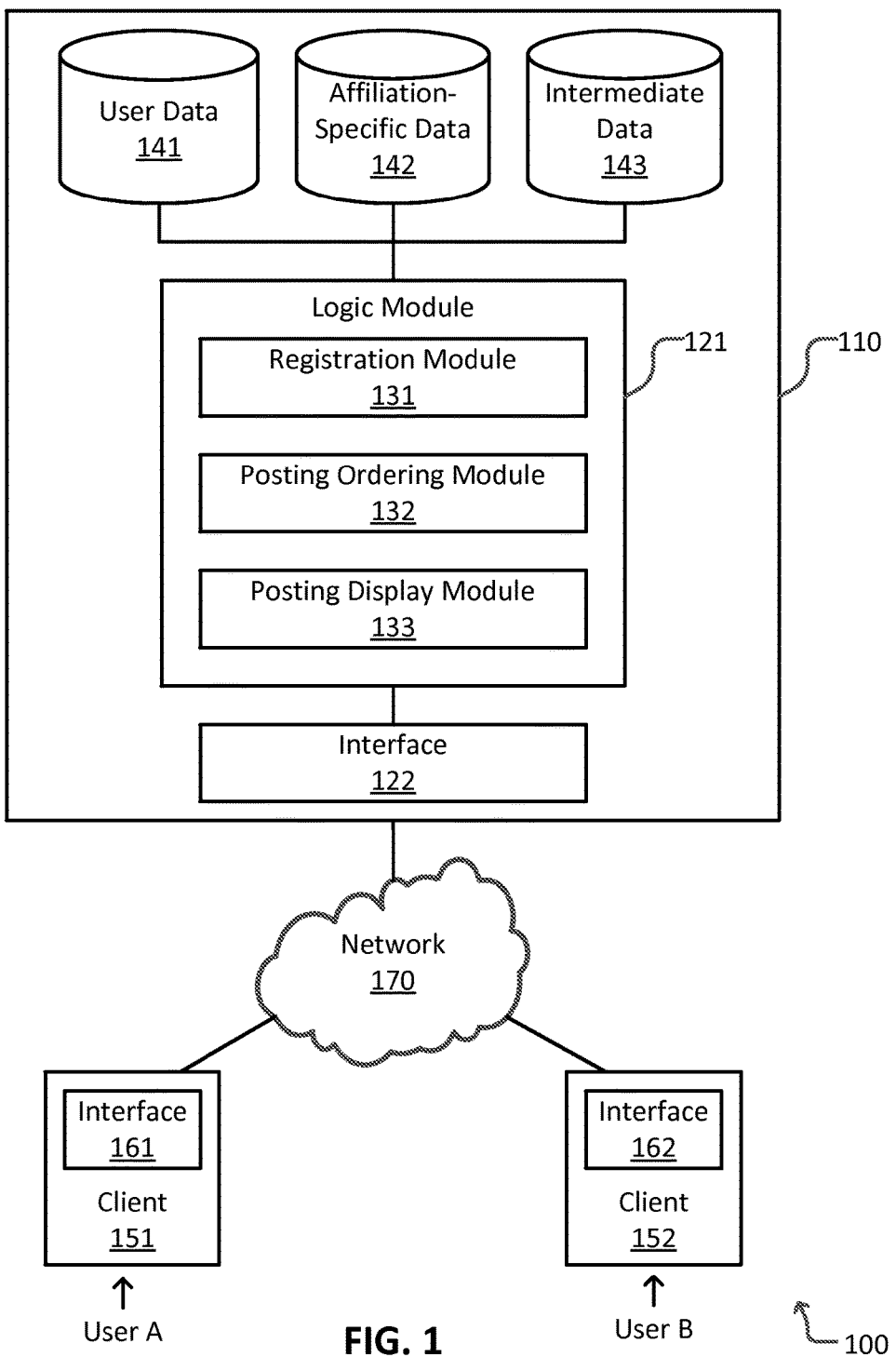
FIG. 1 illustrates an example of an intra-affiliation and inter-affiliation postings management system.

FIG. 1 illustrates an example of an intra-affiliation and inter-affiliation postings management system. Here, system 100 includes an intra-affiliation and inter-affiliation posting manager 110 (as used interchangeably herein with "posting manager" or "application" herein), logic module 121, registration module 131, posting ordering module 132, posting display module 133, user data database 141, affiliation-specific data database 142, intermediate data database 143, posting manager interface 122, network 170, clients 151-152, and client interfaces 161-162. In some examples, client 151 may be used by User "A," and client 152 may be used by User "B." In some examples, posting manager 110 may be configured to receive one or more postings from one or more user accounts (e.g., posters or transmitting account) and to transmit the postings to one or more other user accounts (e.g., recipients or receiving account). One or more accounts identifying user data may be stored in user data database 141. An account may be associated with one or more affiliations and affiliation-specific parameters. An affiliation may be an organization, entity, or group that is associated with, connected to, or related to one or more persons (e.g., members). Examples include a school, a college, a university, a company, an organization, a club, a league, a team, and the like. Each affiliation may be associated with one or more attributes, characteristics, or features. For example, a college may be associated with courses, professors, subject areas, and the like. An affiliation-specific parameter may be a word, name, term, phrase, title, description, or code that is commonly recognized, adopted, or used by members of an affiliation to refer to a particular attribute. An affiliation-specific parameter may be a term that is established, determined, chosen, or set by the affiliation or its members to refer to an attribute. In some examples, a same or an equivalent attribute may be common to more than one affiliation. In other examples, a similar attribute may be referenced by different affiliations using different affiliation-specific parameters. For example, numerous colleges may offer a subject area in the field of engineering that deals with the study and application of electricity, electronics, and electromagnetism. One college may reference this subject area as "Electrical Engineering," while another college may reference it as "Electronics Engineering." As an example, "Electrical Engineering" may be an affiliation-specific parameter associated with the first college, while "Electronics Engineering" may be an affiliation-specific parameter associated with the latter college. An affiliation-specific parameter may refer to a course, a professor, a subject area, or another attribute. Affiliation-specific parameters may be stored in affiliation-specific data database 142. Affiliation-specific parameters may be predetermined by posting manager 110. In some examples, a list of affiliation-specific parameters (e.g., courses, professors, subject areas, and the like) are downloaded from a website of the affiliation (e.g., a college's website) or otherwise obtained from the affiliation. In some examples, a list may be uploaded or stored into affiliation-specific data database 142. A list may be updated manually or automatically, and on command or periodically.

Posting manager 110 may be configured to transmit and order postings for a recipient based on levels of relevancy of the postings to a recipient. A level of relevancy of a posting to a recipient may be a score or measure representing a usefulness, significance, or connection of a posting to a recipient, which may be determined by posting manager 110 based on a comparison or evaluation of data associated with a posting, data associated with an account making a posting, data associated with an account receiving a posting, and other data.

In some examples, application 110 may manage a social network, forum, platform, or other network service. For example, application 110 may be an educational or academic forum for students to ask and answer questions (or make other communications) to each other about courses, professors, subject areas, and the like, and students using application 110 may serve as mentors and mentees to help each other. For example, an account may be used to make an initiating posting, which may include a question or comment, and another account may make a responding posting, which may include an answer to the question or a response to the comment. An initiating posting, a responding posting, or other postings may be associated with an affiliation-specific parameter. In some examples, postings may be transmitted intra-affiliation or inter-affiliation. In intra-affiliation communications, the same set of affiliation-specific parameters may be referenced. In inter-affiliation communications, a poster or posting may refer to one set of affiliation-specific parameters of one affiliation, while a recipient may refer to another set of affiliation-specific parameters of a different affiliation. Intermediate parameters, which may be stored in intermediate data database 143, may be used as a "common language" to which affiliation-specific parameters may be translated or mapped. An intermediate parameter may be a word, name, term, phrase, title, description, or code that is used as an intermediate step to facilitate comparisons of an affiliation-specific parameter of one affiliation to an affiliation-specific parameter of another affiliation. An intermediate parameter may be a temporary name used by posting manager 110 to refer to an attribute. An intermediate parameter may be the same as or different from an affiliation-specific parameter. For example, an intermediate parameter referring to the field of engineering that deals with the study and application of electricity, electronics, and electromagnetism may be referenced as "Electrical, Electronics, and Computer Engineering." Affiliation-specific parameters stored in database 142 may be compared to intermediate parameters stored in database 143. Based on the comparisons, affiliation-specific parameters may be mapped to intermediate parameters. For example, both affiliation-specific parameters "Electrical Engineering" and "Electronics Engineering" may be mapped to intermediate parameter "Electrical, Electronics, and Computer Engineering." After being mapped to a common language, posting manager 110 may determine relevancy of a posting to a recipient across different affiliations. Intermediate parameters may be predetermined by posting manager 110. In some examples, a list of intermediate parameters may be downloaded from a website of or otherwise obtained from a governmental or other entity, which may oversee the affiliations (e.g., a department of education, etc.). In other examples, intermediate parameters may be obtained, derived, and compiled from one or more affiliations. A list may be uploaded or stored in intermediate data database 143. In other examples, intermediate parameters may be determined by one or more users. Intermediate parameters may be updated manually or automatically, and on command or periodically.

In some examples, posting manager 110 may include logic module 121, which may include registration module 131, posting ordering module 132, and posting display module 133. Registration module 131 may be configured to receive user data associated with a new or existing account. Registration module 131 may identify an affiliation of a user without a user directly entering the name of the affiliation into posting manager 110. In some examples, registration module 131 may request an email address of the user, and based on the email address both identify the affiliation and authenticate the email address. After the affiliation is identified, information associated with the affiliation may automatically be transmitted to a user. This information may include one or more affiliation-specific parameters. For example, registration module 131 may request a user to enter user data by making a selection from one or more affiliation-specific parameters (e.g., in the form of a dropdown menu, auto-complete textbox, checkbox, etc.). For example, rather than having a user type in the subject area of his major, a list of subject areas at his college may be transmitted to his account, and he may choose a subject area from the list. Other information associated with an affiliation that may be transmitted to a user includes postings that are relevant to the user based on an affiliation of the user. For example, a posting may be determined to be relevant to a user because the poster and the user are both associated with the same affiliation.

Posting ordering module 122 may be configured to determine and transmit an order of postings to one or more recipients. In some examples, a different order may be determined for each recipient based on a relevancy of the postings to each recipient. A relevancy of a posting to a recipient may be determined based on a variety of factors, including information related to the posting, information related to the poster, information related to the recipient, and the like. Such information may include affiliation-specific parameters. Affiliation-specific parameters may be mapped to intermediate parameters, which may be used for determining a level of relevancy. For example, a posting on a subject area in which a recipient is majoring in may be determined to have a higher level of relevancy than a posting on a subject area in which the recipient is not majoring in. The posting may be associated with a subject area of one affiliation, while the recipient may be associated with a subject area of a different affiliation, and a determination that these subject areas match may be performed based on a mapping of these two subject areas to the intermediate parameter. Postings with a higher level of relevancy may have a higher position in an order of postings. For example, in a display of numerous postings, postings with a higher position may be displayed first or on the top of the list, which may increase the likelihood or ease with which a recipient may see more relevant postings.

Posting display module 133 may be configured to determine an identification tag of a user to be displayed with a posting made by the user. In some examples, an identification tag may be used to attribute a posting to a poster. An account of a user stored in user data database 141 may be associated with one or more identification tags, for example, a name of the user and a pseudonym of the user. A posting may be classified according to one or more posting types, for example, an initiating posting (e.g., a question, a first posting in a thread, etc.) and a responding posting (e.g., an answer to a question, a latter posting in a thread, etc.). Some posting types may be configured to be displayed with some identification tags, while other postings types may be restricted from being displayed with other identification tags. For example, an initiating posting may be displayed with a name or a pseudonym, while a responding posting may be displayed with a name. When a posting is received, posting display module 133 may determine a posting type, transmit a request to make a selection from a list of identification tags that are permitted with the posting type, and then transmit the posting along with the selected identification tag. Posting display module 133 may further transmit and display other user data of a poster, including one or more affiliation-specific parameters associated with a poster.

In some examples, network 170 may be the Internet, a local area network (LAN), wide area network (WAN), wireless local area network (WLAN), municipal area network (MAN), or another type of network. Data may be exchanged between application 110 and clients 151-152 directly or indirectly. In some examples, data sent from clients 151-152 may be received by logic module 121 using interface 122. Data may be downloaded from application 110 to clients 151-152. Data may be transferred between application 110 and clients 151-152 in various formats (e.g., electronic/electrical signals, wireless signals, files, XML messages, and the like). Clients 151-152 may be a smartphone, tablet, laptop, computer, or other computing device. Client interfaces 161-162 may include a user interface, such as a keyboard, a mouse, a display, a loudspeaker, a microphone, a vibration generator or motor, a sensor, a touch-sensitive screen, or other input-and-output device. Client interfaces 161-162 may also include software such as software modules, Internet browsers, applications, and the like, which may be implemented on a smartphone, tablet, laptop, computer, or other computer device. Databases or repositories 141-143 may be stored on one memory, different memories, or distributed across several memories or servers. The types, number, and configuration of components of system 100 may be varied. For example, application 110 and its various components may be hosted on one or multiple servers or devices, which may be local or remote from each other.

Figure 2A:
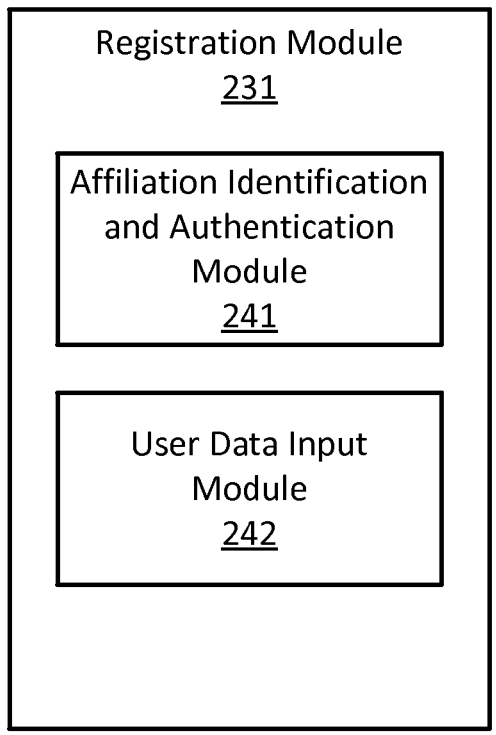
FIGS. 2A, 2B, and 2C illustrate examples of application architectures for components of the logic module of an intra-affiliation and inter-affiliation posting manager.
Figure 2B:
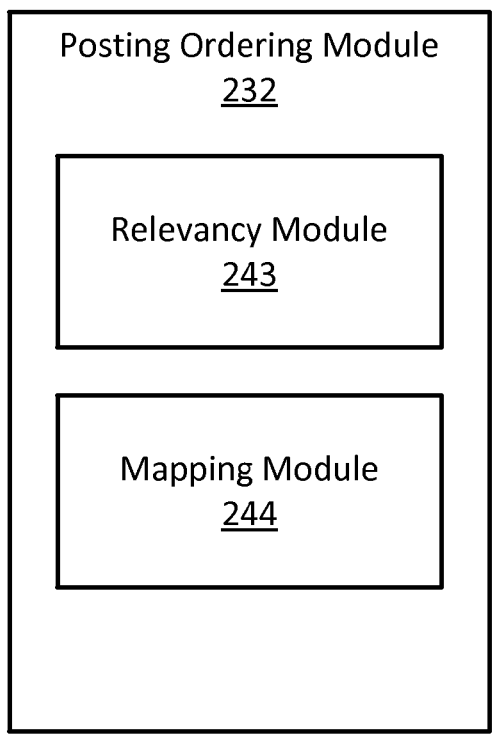
Figure 2C:
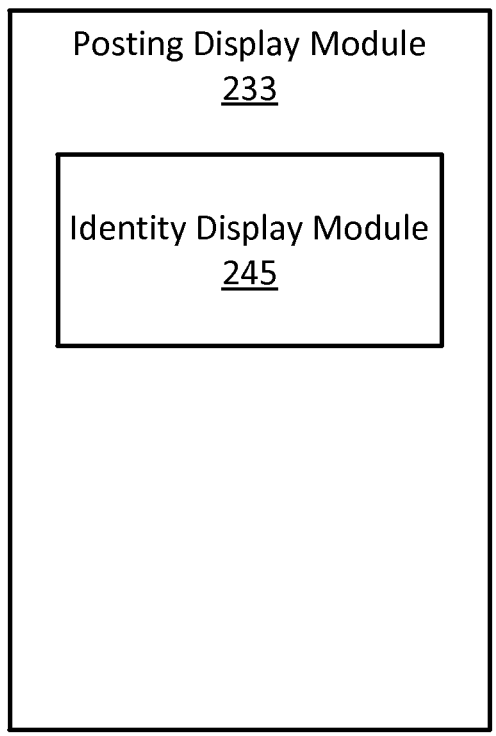

FIGS. 2A, 2B, and 2C illustrate examples of application architectures for components of the logic module of an intra-affiliation and inter-affiliation posting manager. Each component and sub-component may be implemented on one or more servers or devices. As shown in FIG. 2A, registration module 231 includes an affiliation identification and authentication module 241 and a user data input module 242. Affiliation identification and authentication module 241 may be configured to use a user's email address both to identify an affiliation of a user and to authenticate an email address. After an email address is received, affiliation identification and authentication module 241 may transmit a message (e.g., an email message) to an email address, and the message may contain data configured to authenticate the email address. For example, an email message may contain a uniform resource locator (URL), link, or address, which may be accessed to indicate receipt of an email message or to otherwise authenticate an email address. Affiliation identification and authentication module 241 may also reference at least a portion of an email address against a library to identify an affiliation associated with an email address. A library may be a table, a database, an array, an index, a list, a set of pointers or objects, or the like, which may be used to look up or search for a value, verify data, determine associated or related data, or similar functions. A library may be local or remote to registration module 231. For example, a domain name of the email address may be referenced against a library, which may store one or more domain names and their respective affiliations. For example, a domain name "@cornell.edu" may be associated with an affiliation "Cornell University." Thus, an affiliation may be identified without a user having to type in or otherwise enter the name of the affiliation. After an affiliation is identified, data associated with the affiliation may be transmitted to a user, which may include one or more affiliation-specific parameters associated with the affiliation, one or more postings determined to be relevant to the user based on the affiliation, and the like.

User data input module 242 may be configured to receive user input of user data from a client. User data input module 242 may store the user data in a user account in a user data database. User data input module 242 may request user data from a user by providing a list of affiliation-specific parameters from which the user may choose. In some examples, a list may be provided in the form of a dropdown menu, auto-complete textbox, checkbox, or other. A set of affiliation-specific parameters to retrieve from an affiliation-specific data database may be based on an affiliation identified by affiliation identification and authentication module 241. For example, if the affiliation "Cornell University" is identified, a list of subject areas offered at Cornell University may be provided, and a user may select his major or minor from the list. In addition, a user may enter other user data (e.g., courses taken by the user, professors taken by the user, grade point average (GPA), Scholastic Assessment Test (SAT) scores, American College Testing (ACT) scores, interests, etc.), or the like.

As shown in FIG. 2B, posting ordering module 232 may include a relevancy module 243 and a mapping module 244. Relevancy module 243 may be configured to determine a level of relevancy of a posting to a user. Relevancy may be determined based on factors such as a topic, a poster's characteristics and account activity, a user's characteristics and account activity, and the like. Postings may be delivered to a user based on relevance. In some examples, postings that have a level of relevancy below a threshold may not be delivered to the user. Postings delivered to a user may be displayed as a list (e.g., a newsfeed) at a client device used by the user. A set of postings may be ordered based on the relevancy of each posting to the user. For example, a more relevant posting may be displayed before a less relevant posting. In some examples, a user may manually filter, sort, or organize the postings delivered to him. A user may customize the topics, user characteristics, or other factors that are most relevant to him. Relevancy module 243 may determine a relevancy of a posting based on a user's modified set of relevancy factors.

In some examples, mapping module 244 may be configured to map or compare affiliation-specific parameters. An affiliation-specific parameter of one affiliation may be mapped to an intermediate parameter, or to an affiliation-specific parameter of another affiliation. A mapping may enable or facilitate relevancy module 243 in determining a level of relevancy of inter-affiliation communications. For example, affiliation-specific parameters associated with a posting, a poster, and/or a recipient may first be mapped to intermediate parameters, and the intermediate parameters may be evaluated or compared in order to make a relevancy determination.

As shown in FIG. 2C, a posting display module 233 may include an identity display module 245. Identity display module 245 may be configured to display a posting along with an identification tag and other information of the poster, including affiliation-specific parameters associated with the poster. Identity display module 245 may also display identification tags and affiliation-specific parameters as part of a user biography, or other identification or description of a user. An identification tag may be a term that is used to identify a user or to attribute a posting to a poster. Examples include a name of a user, a pseudonym of a user, a username of a user, and the like. One account of a user may be associated with one or more identification tags. Postings may be classified as one or more posting types, of which some posting types permit some identification tags to be used, and other postings types permit other identification tags to be used. After determining a posting type, identity display module 245 may request the poster to select one identification tag from a list of identification tags permitted for that posting type. Identity display module 245 may also determine a default identification tag to be used with a posting type. In some examples, a selected or default identification tag may be displayed with the posting to a recipient. Identity display module 245 may further display other information of the poster, including affiliation-specific parameters and/or intermediate parameters associated with the affiliation-specific parameters (e.g., college, subject area, course, professor, etc.). Modules 231-233 and 241-245 may be separate from or integrated with each other, and may be local to or remote from each other. Still, other modules or sub-modules may be used.

Figure 3:
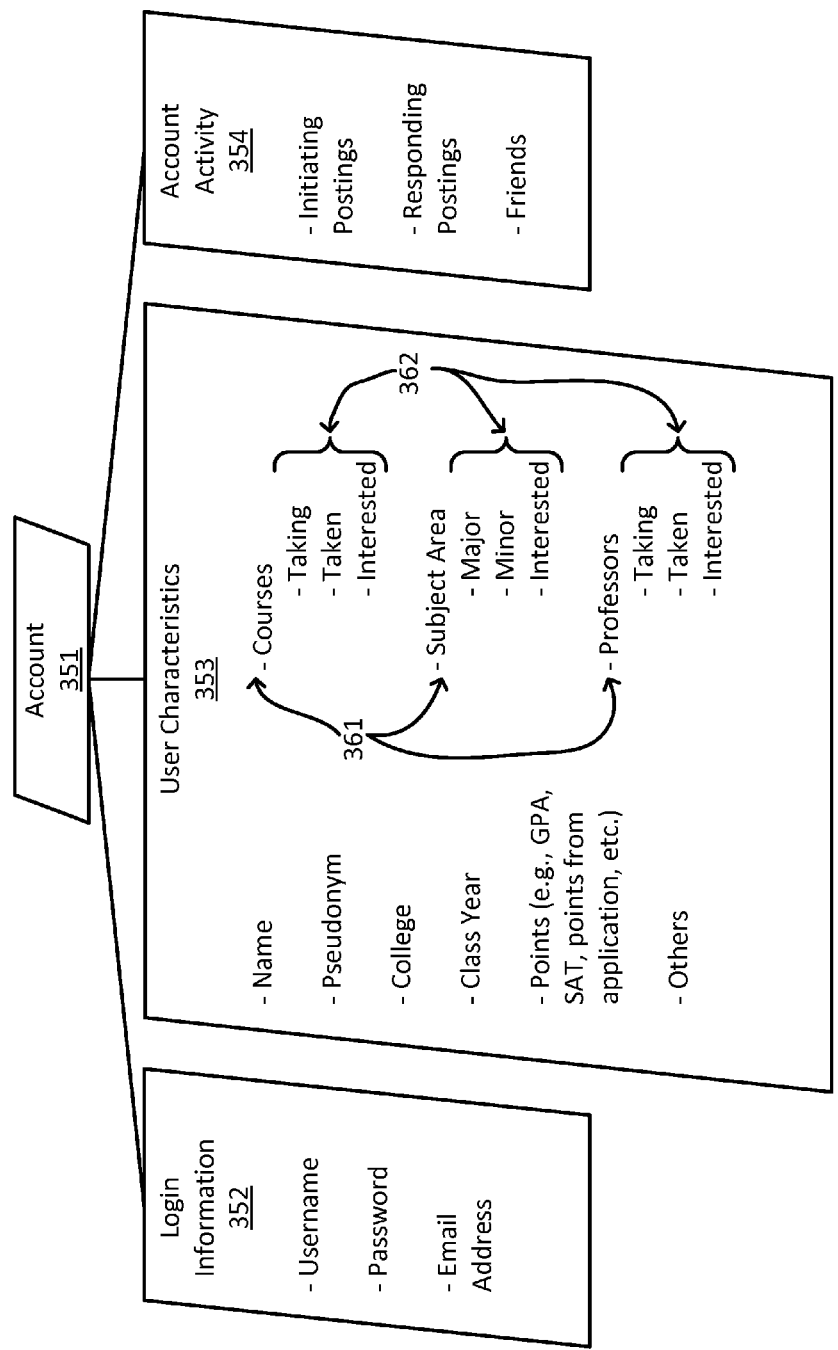
FIG. 3 illustrates an example of a data structure of an account.

FIG. 3 illustrates an example of a data structure of an account. Here, account 351 may be associated with login information 352, user characteristics 353, account activity 354, and other parameters. Login information 352 may include a username, a password, one or more email addresses, and the like. Account activity 354 may include information associated with initiating postings (e.g., a number or quality of initiating postings made, topics of initiating postings, etc.), information associated with responding postings (e.g., a number or quality of responding postings made, topics of responding postings, the posters of initiating postings to which responding postings are made, etc.), friends, and the like. A user may relate to other users by being a "friend" of other users, "following" other users, and the like.

An account may also be associated with user characteristics 353, which may include a name, a pseudonym (which may be the same as or different from the username), an affiliation or college, a class year, points (e.g., GPA, SAT scores, ACT scores, points assigned by a posting manager (e.g., based on account activity, such as making postings, entering user data, quality of postings, etc.), and the like), courses, subject areas (e.g., majors, minors, etc.), professors, and others. User characteristics 353 may include one or more affiliation-specific parameters 361. For example, a student may be taking courses referred to as "EE 201" and "EE 202" by her college, which are taught by "John Brown," who is a professor at her college, and user characteristics may include "EE 201," "EE 202," and "John Brown." Entry of user characteristic 353 may be performed by selecting from a list of affiliation-specific parameters provided by a posting manager. Thus, users of the same affiliation may refer to the same attribute using the same affiliation-specific parameter. A set of affiliation-specific parameters provided by a posting manager may be modified or customized by a user. For example, a user may add a new affiliation-specific parameter or modify an existing affiliation-specific parameter. A new or revised affiliation-specific parameter may become part of a set of affiliation-specific parameters that is provided by the posting manager to users of the same affiliation.

There may be different levels of association 362 between account 351 and user characteristics 353. Level of association 362 may specify or add detail to how a user of account 351 relates to a user characteristic 353. For example, a user may be currently taking a course, may have taken the course previously, or may be interested in the course, each case being a different level of association. As an example, a user may be majoring in, minoring in, or interested in a subject area. As another example, a user may be taking, have taken, or interested in a professor. For example, a user who is currently taking a course may have a higher level of association with the course than a user who previously took the course. A user who majors in a subject area may have a higher level of association with the subject area than a user who minors in the subject area. A level of association may be used as part of a relevancy determination or other operations of a posting manager.

User characteristics 353 may also include other parameters. For example, a user may be associated with an attribute that is not included in a set of affiliation-specific parameters that is predetermined by a posting manager. For example, "SAT" may not be an affiliation-specific parameter but it may still be stored as a user characteristic 353. For example, a user who is a college student interested in helping high school students in learning more about the SAT's may enter "SAT" as one of his user characteristics. As another example, a user who is a high school student interested in learning more about the SAT's may enter "SAT" as one of her user characteristics. This parameter may be used as part of a relevancy determination or other operations of a posting manager. Still other parameters and data structures may be used.

Figure 4:
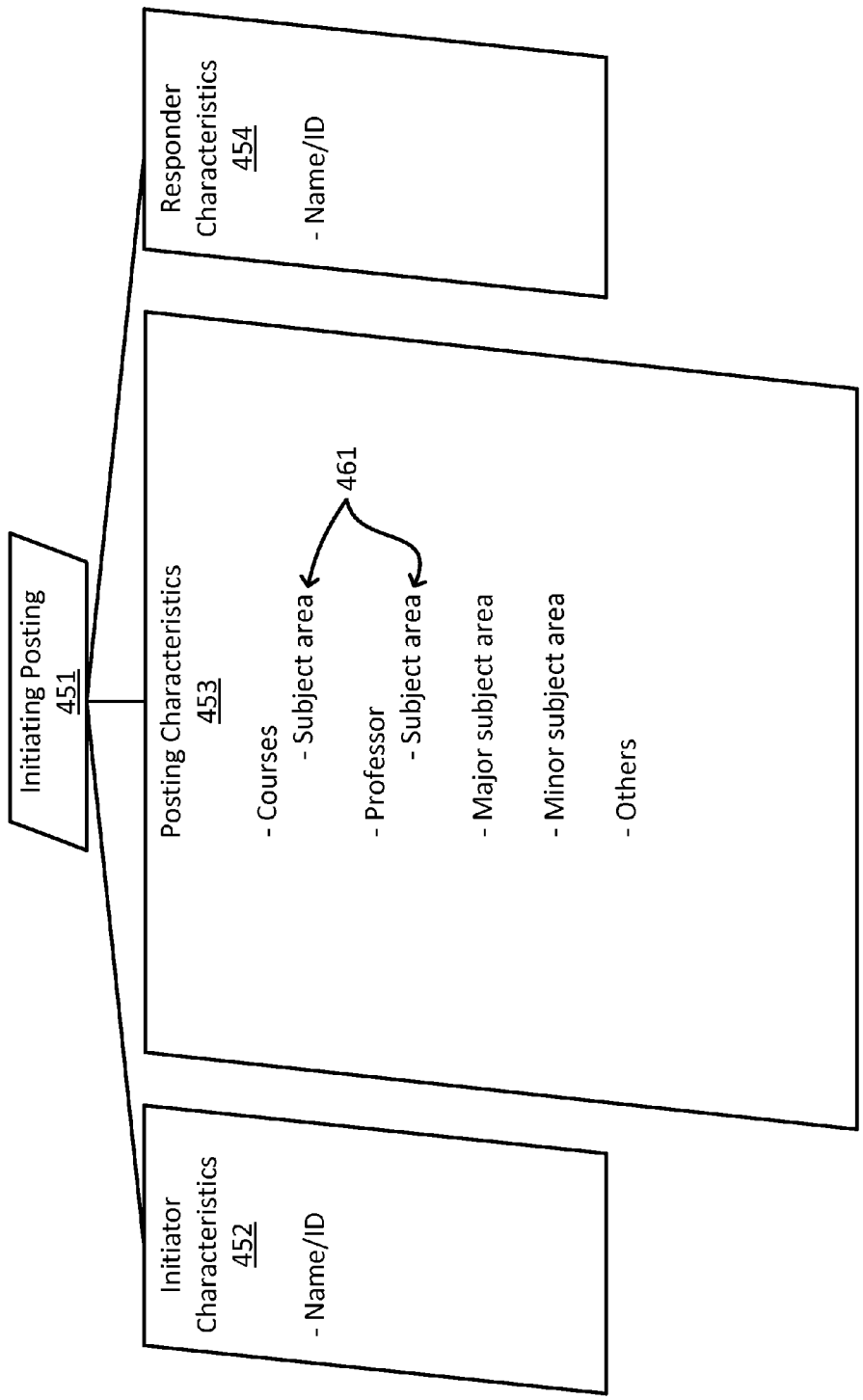
FIG. 4 illustrates an example of a data structure of an initiating posting.

FIG. 4 illustrates an example of a data structure of an initiating posting. Here, initiating posting 451 may be associated with initiator characteristics 452, posting characteristics 453, responder characteristics 454, and other parameters. An initiating posting 451 may be a posting that starts a new thread of communications. An initiating posting 451 may not be a response to another posting. For example, an initiating posting may be a question or comment posted by a user, and it may solicit responsive postings that provide information in response to the question, or the like. Initiator characteristics 452 may include a name or other identification of an initiator, or a poster of initiating posting 451. Responder characteristics 454 may include a name or other identification of a responder, or a user who posts a response to initiating posting 451.

Posting characteristics 453 may indicate one or more topics associated with initiating posting 451, including a course, a professor, a major subject area, a minor subject area, among others. One or more posting characteristics 453 may be entered or specified by a user when he makes a posting. For example, a posting stating, "Should I take Professor John Brown's courses EE 201 and EE 202?," may be associated with courses "EE 201" and "EE 202" as well as "Professor John Brown." A user may specify a posting characteristic 453 by making a selection from numerous affiliation-specific parameters provided by a posting manager. Thus, users of the same affiliation may refer to the same attribute using a same or similar affiliation-specific parameter. A user may also create, modify, or customize an affiliation-specific parameter. A new or revised affiliation-specific parameter may become part of a set of affiliation-specific parameters provided by a posting manager to users of the same affiliation, and may be selected by a user as a posting characteristic 453. Posting characteristics 453 may further include one or more secondary characteristics 461, which may be further parameters related to the primary characteristics of initiating posting 451. For example, initiating posting 451 may include a question about a course (e.g., "EE 201"). Its posting characteristics 453 may include the course (e.g., "EE 201") as well as a secondary characteristic identifying the subject area of the course (e.g., "Electrical Engineering"). Still other parameters and data structures may be used.

Figure 5:
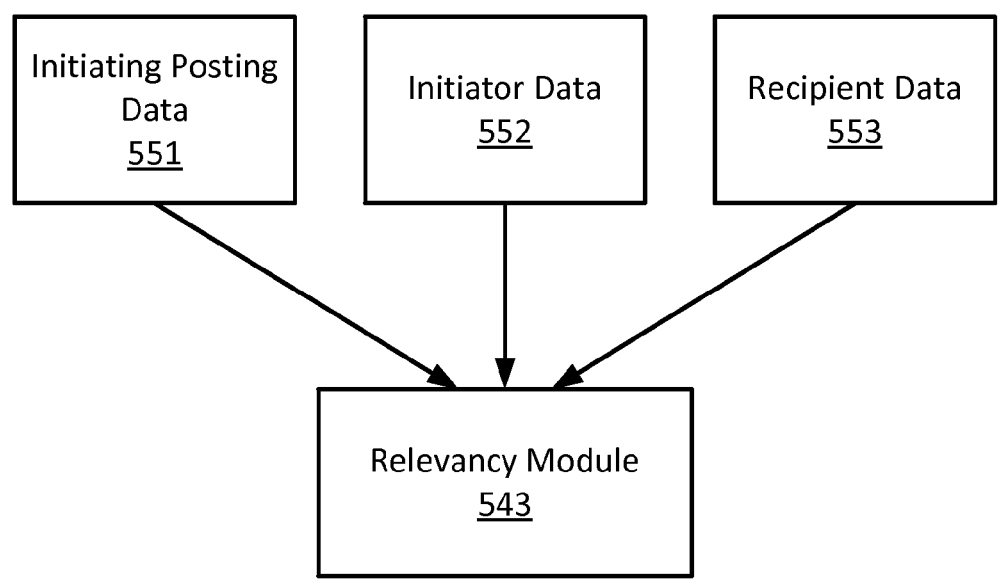
FIG. 5 illustrates examples of data inputs to a posting ordering module of an intra-affiliation and inter-affiliation posting manager.

FIG. 5 illustrates examples of data inputs to a posting ordering module of an intra-affiliation and inter-affiliation posting manager. As shown, FIG. 5 depicts a relevancy module 543, initiating posting data 551, initiator data 552, and recipient data 553. As described above, relevancy module 543 may be configured to determine a level of relevancy (e.g., a relevancy score) of an initiating posting to a recipient based on initiating posting data 551, initiator data 552, recipient data 553, and other data. Initiating posting data 551 may include initiator characteristics 452, posting characteristics 453, responder characteristics 454, and the like. Initiator data 552 may include user data of the poster of the initiating posting, such as login information 352, user characteristics 353, account activity 354, and the like. Recipient data 553 may include user data of a recipient, such as login information 352, user characteristics 353, and account activity 354, among others. Relevancy module 543 may determine a relevancy of an initiating posting to each of one or more recipients, using recipient data 553 of each recipient. In some examples, a posting may have a different level of relevancy for each recipient. Relevancy module 543 may perform one or more comparisons using initiating posting data 551, initiator data 552, and recipient data 553. Each comparison may result in a weight or an intermediate score. A level of relevancy may be determined based on the combination of weights, as further described with respect to FIGS. 6, 7, and 8.

FIG. 6 illustrates an example of data evaluation by a posting ordering module of an intra-affiliation and inter-affiliation posting manager. Here, table 600 includes examples of evaluations of initiating posting data 651 and recipient data 652, and weights 670. In some examples, a comparison between initiating posting data 651 and recipient data 652 may be made. As shown, for example, an entry 681 of table 600 represents a comparison of a course indicated by a posting characteristic of an initiating posting with a course indicated by a recipient characteristic of a recipient. Entry 681 also shows a weight that results from the comparison if a match is found. In some examples, initiating posting data 651 and recipient data 652 may be selected from affiliation-specific parameters provided by a posting manager. Thus, a match may be found if the same affiliation-specific parameter is being referenced, for example, a posting characteristic of an initiating posting refers to the same affiliation-specific parameter as a recipient characteristic of a recipient. In some examples, a weight (e.g., "10") may be determined based on a match. In other examples, a match may be found if initiating posting data 651 and recipient data 652 are substantially similar. For example, a course indicated by initiating posting data 651 may be "EE 201" and a course indicated by recipient data 652 may be "EE 301," and "EE 301" may be an advanced version of "EE 201." A different weight may be determined based on this match. As another example, initiating posting data 651 and recipient data 652 may be manually entered by a user (e.g., in text format), and the text used by a poster and a recipient may differ. A match may be found based on a substantial similarity, and a weight may be determined based on the match or a level of similarity. In other examples, matches may be determined differently.

One or more evaluations or comparisons may be made. As shown, for example, a subject area associated with a posting may be compared with a subject area associated with a recipient. As another example, a subject area as a secondary characteristic associated with a posting (e.g., a subject area of a course on which a posting is about) may be compared with a subject area associated with a recipient. As another example, a subject area associated with a posting may be compared with a recipient's account activity (e.g., whether the recipient has made an initiating posting about the course or subject area, whether the recipient has made a responding posting about the course or subject area, etc.). For each of the data evaluations, a weight may be assigned. One or more weighting factors (e.g., weights) may be combined to determine a level of relevancy of a posting to a recipient. A combination may be based on a variety of operations, including addition, multiplication, or other mathematical or statistical analysis. In other examples, a combination may be determined differently.

Figure 7A:
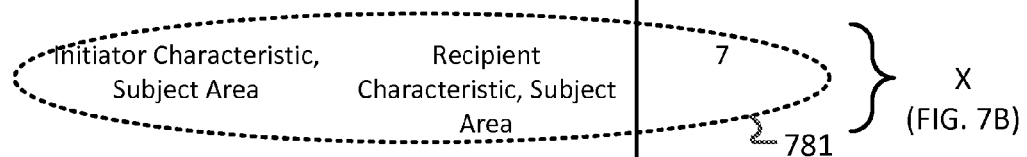
FIGS. 7A and 7B illustrate another example of data evaluation by a posting ordering module of an intra-affiliation and inter-affiliation posting manager.
Figure 7B:

FIGS. 7A and 7B illustrate another example of data evaluation by a posting ordering module of an intra-affiliation and inter-affiliation posting manager. As shown in FIG. 7A, table 700 includes examples of evaluations of initiator data 751 and recipient data 752, and weights 770. In some examples, a comparison between initiator data 751 and recipient data 752 may be made. For example, a course included in user characteristics associated with an initiator may be compared with a course included in user characteristics associated with a recipient. As described above with respect to FIG. 6, a match may be found if the data are the same or substantially similar. A weight may be given based on whether a match is found and/or a level of similarity. Additional evaluations may be made on other data such as subject area, account activity, and the like. An evaluation may be made to determine if a relationship exists between an initiator and a recipient. For example, initiator data 751 may include account activity of the initiator, which may include a previous initiating posting made by an initiator. A previous initiating posting may indicate a name of a responder. This name may be compared to a name of a recipient as indicated by recipient data 752. In some examples, a match may indicate that the recipient had previously responded to an initiating posting made by an initiator. Similarly, a determination may be made as to whether an initiator's "friends" include a recipient. Weights 770 may be determined based on the data evaluations. Weights 770 may be combined with other weights (e.g., weights 670 of FIG. 6) to determine a level of relevancy. In other examples, relevancy may be determined differently.

As shown in FIG. 7B, table 701 includes other examples of evaluations of initiator data 753 and recipient data 754, and weights 771. Table 701 includes evaluations that takes into account levels of association of initiator data 753 and recipient data 754 to an initiator and a recipient, respectively. A weight may be determined based on not only a match of the data, but also the level of association of the data. In some examples, rather than using entry 781 of table 700, one or more entries of table 701 may be used. For example, a subject area associated with an initiator may match a subject area associated with a recipient. But different weights may be determined based on whether a subject area is a major, minor, or interest of the initiator or recipient. Higher weights may be determined based on higher levels of association. As shown, for example, a greater weight is provided where both the initiator and the recipient major in the same subject area than where the initiator majors in the subject area but the recipient minors in the subject area.

Figure 8:
FIG. 8 illustrates another example of data evaluation by a posting ordering module of an intra-affiliation and inter-affiliation posting manager.

FIG. 8 illustrates another example of data evaluation by a posting ordering module of an intra-affiliation and inter-affiliation posting manager. Table 800 includes other data 851 that may be evaluated, and weights 870. As shown, for example, a date of a posting may affect the determination of a weight, and thus a posting's relevancy. As another example, a relevancy of a posting being made by an initiator may be affected by the number of initiating postings previously made by him. For example, a user who makes too many initiating postings (i.e., a number of initiating postings previously made exceeds a threshold) may lower the relevancy of his future postings, which may lower the positions of his future postings in an order of postings to be transmitted and displayed to a recipient. Weights 870 may be combined with other weights (e.g., weights 670 of FIG. 6, weights 770 and 771 of FIG. 7, etc.). A relevancy of a posting to a recipient may be based on a combination of weights. Still, other factors may be considered in determining a relevancy of a posting.

Figure 9A:
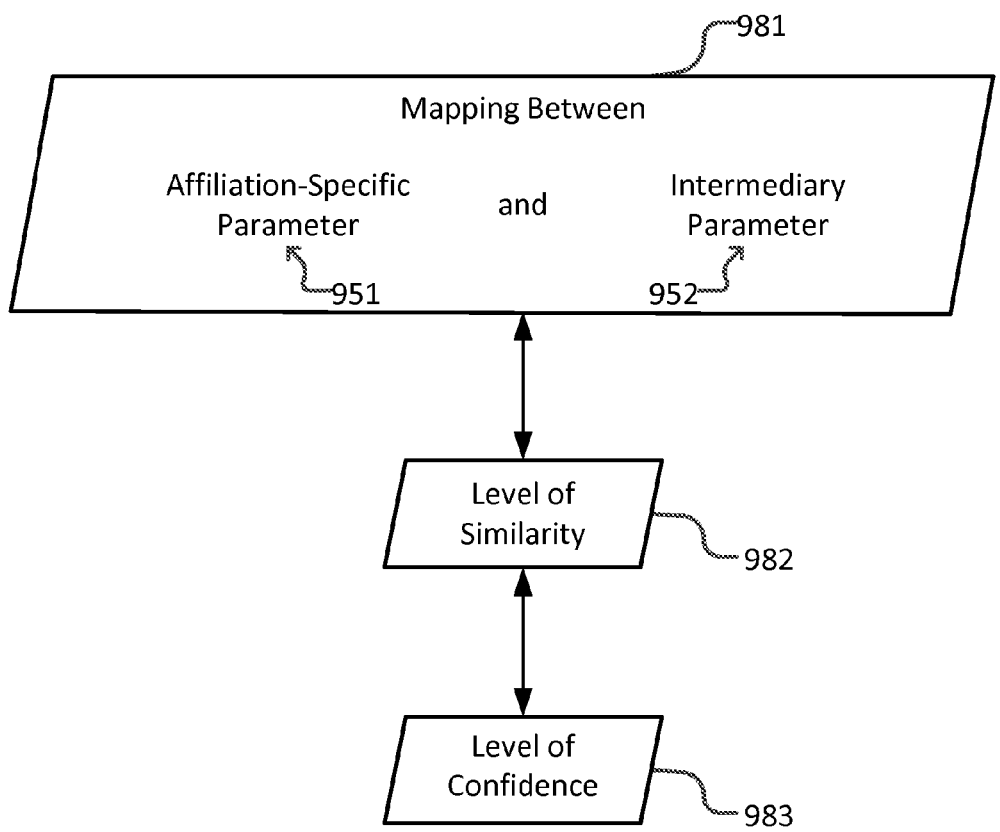
FIGS. 9A and 9B illustrate examples of a mapping of an affiliation-specific parameter by a posting ordering module of an intra-affiliation and inter-affiliation posting manager.
Figure 9B:
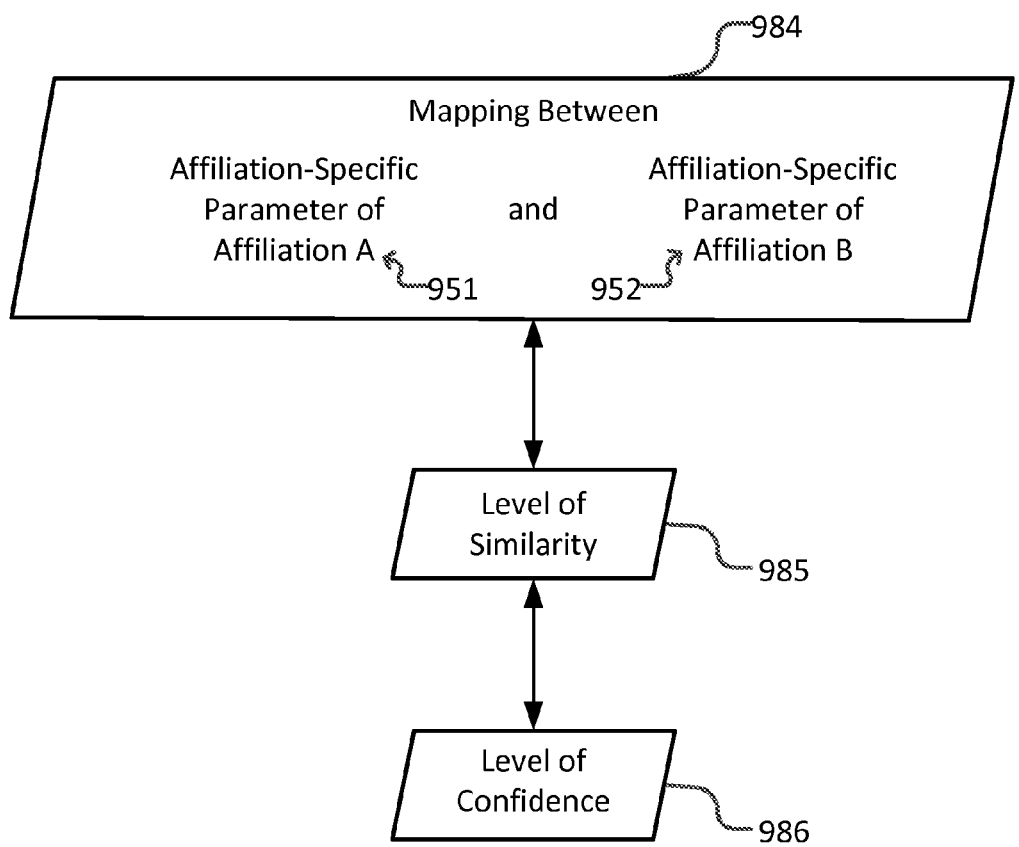

FIGS. 9A and 9B illustrate examples of a mapping of an affiliation-specific parameter by a posting ordering module of an intra-affiliation and inter-affiliation posting manager. An affiliation-specific parameter 951 may be a term used by an affiliation or commonly used by its members to refer to an attribute or characteristic of an affiliation. For example, a course on a topic may be referred to by different names, words, labels, phrases, titles, descriptions, or codes in different schools. Members of an affiliation may be unaware of different names used by members of another affiliation. In some examples, a posting manager may be configured to manage inter-affiliation postings by mapping affiliation-specific parameters. Affiliation-specific parameters may be mapped to intermediate parameters, which may be used as a common or intermediate language for making evaluations and comparisons across affiliations. Mappings may be performed for a variety of affiliation-specific parameters (e.g., courses, subject areas, professors, and the like). For example, a course number and/or a course title may be mapped to an intermediate parameter. As an example, a title "Circuits and Signals" of a course offered at Cornell University and a title "Circuits, Signals, and Systems" of a course offered at Stanford University may map to a same intermediate parameter, such as "Circuits, Systems, and Signal Mapping." As another example, a number "EE 201" of a course titled "Circuits and Signals" of Cornell University, and a number "ECE 328" of a course titled "Circuits, Signals, and Systems" of Stanford University may also map to a same intermediate parameter. After mapping, a relevancy module may use intermediate parameters for data evaluations, such as data evaluations shown in FIGS. 6, 7, and 8. As shown, FIG. 9A depicts an affiliation-specific parameter 951, an intermediary parameter 952, a mapping 981, a level of similarity 982, and a level of confidence 983. In some examples, a set of affiliation-specific parameters and a set of intermediate parameters may be predetermined and stored in one or more data repositories of a posting manager. Affiliation-specific parameters may then be compared with intermediate parameters. A comparison may be based on string matching, machine learning, natural language processing, or other techniques. An affiliation-specific parameter may be mapped to an intermediate parameter if these parameters are substantially similar. For example, a comparison may yield a level of similarity between an affiliation-specific parameter and an intermediate parameter, and a mapping may be established if the level of similarity exceeds a threshold.

In some examples, mappings of one or more parameters, including their respective levels of similarity, may be predetermined by a posting manager and may be stored as a table. A table may be referenced when an affiliation-specific parameter is received, evaluated, or used by a posting manager. For example, a user inputs affiliation-specific input 951. Mapping 981 is performed by referencing a predetermined table, and an intermediate parameter 952 is determined. As another example, a table of mappings may not be predetermined, and mapping 981 is performed by comparing affiliation-specific parameter 951 to intermediate parameter 952 in real-time (e.g., when affiliation-specific parameter 951 is received, evaluated, or otherwise used by a posting manager). As described above, a level of similarity may be determined based on a comparison between an affiliation-specific parameter and an intermediate parameter. For example, a comparison may include string matching or partial string matching, and a level of similarity be based on the number of letters that are the same or different. Other types of comparisons or operations may also be used. A level of similarity 982 may be associated with mapping 981 between the affiliation-specific parameter and the intermediate parameter and stored in a table. When mapping 981 is retrieved or looked up from a table, level of similarity 982 associated with mapping 981 may also be retrieved from the table. A table may be stored in a memory of a posting manager. A memory may be any type of data repository or storage device (e.g., random-access memory (RAM), read-only memory (ROM), etc.), and may include one or more repositories or devices, local or remote to each other.

In some examples, a level of confidence 983 may be determined using a level of similarity 982. In other examples, level of confidence 983 may be associated with mapping 981 and stored in a table. In some examples, level of confidence 983 may be same as or similar to level of similarity 982. In other examples, level of confidence 983 may be modified based on other factors such as user input. For example, level of confidence 983 associated with mapping 981 may be increased when a user manually verifies that affiliation-specific parameter 951 should be mapped to intermediate parameter 952. Based on multiple user verifications, crowd sourcing may be used to improve the accuracy of mappings and relevancy determinations. In some examples, level of confidence 983 associated with mapping 981 may be below a threshold. A prompt may be transmitted to a user, requesting the user to verify the mapping. Level of confidence 983 may be adjusted based on the user's response. For example, an affiliation-specific parameter "Electronics Science" may be mapped to an intermediate parameter "Electrical, Electronics, and Computer Engineering" with a level of confidence. A prompt may be displayed on a client interface, asking questions such as "Should 'Electronics Science' be mapped to 'Electrical, Electronics, and Computer Engineering'?" or "Do you think the subject area 'Electronics Science' is equivalent to the subject area 'Electrical, Electronics, and Computer Engineering'?" If a user responds "Yes," the level of confidence may be increased or otherwise adjusted.

In some examples, level of similarity 982 and/or level of confidence 983 may be used as a weight, which may be combined with weights 670, 770, 771, and 870 shown in FIGS. 6, 7, and 8, to determine a level of relevancy. For example, an affiliation-specific parameter associated with an initiator may be mapped to an intermediate parameter, and another affiliation-specific parameter associated with a recipient may be mapped to the same intermediate parameter. A match may be found, and a weight may be determined. In addition, levels of confidence associated with the mappings may be determined, and another weight may be determined based on levels of confidence. A greater level of confidence may result in a greater weight. For example, an initiator may major in "Electronics Engineering," which may be mapped to intermediate parameter "Electrical, Electronics, and Computer Engineering." A first recipient may major in "Electronics Science," and a second recipient may major in "Electrical and Electronics Engineering," both of which may map to the same intermediate parameter "Electrical, Electronics, and Computer Engineering." A match may be found between the majors of the initiator and the first recipient and the majors of the initiator and the second recipient. However, a level of confidence of the mapping associated with the first recipient may be lower than a level of confidence of the mapping associated with the second recipient. Therefore, a level of relevancy of the initiator's posting to the first recipient may be lower than a level of relevancy of the initiator's posting to the second recipient.

As shown, FIG. 9B depicts an affiliation-specific parameter of affiliation "A" 953, an affiliation-specific parameter of affiliation "B" 954, a mapping 984, a level of similarity 985, and a level of confidence 986. Here, for example, intermediate parameters may not be used, and affiliation-specific parameter of affiliation "A" 953 may be directly mapped to affiliation-specific parameter of affiliation "B" 954. For example, an evaluation of parameters 953 and 954 may be made as part of a relevancy determination. At or around this time, a comparison of parameters 953 and 954 may be made. A comparison may be based on string matching, machine learning, natural language processing, and the like, and level of similarity 985 may be determined. A mapping 984 may be established based on level of similarity 985 (e.g., above a threshold, etc.). Further, a level of confidence 986 may be derived from level of similarity 985. For example, level of confidence 986 may be similar to level of similarity 985, or level of confidence 986 may be modified based on user verification or crowd sourcing. One or more weights may be determined based on mapping 984, level of similarity 985, and/or level of confidence 986. As described herein, weights may be used to determine a level of relevancy of a posting to a recipient.

Figure 10A:
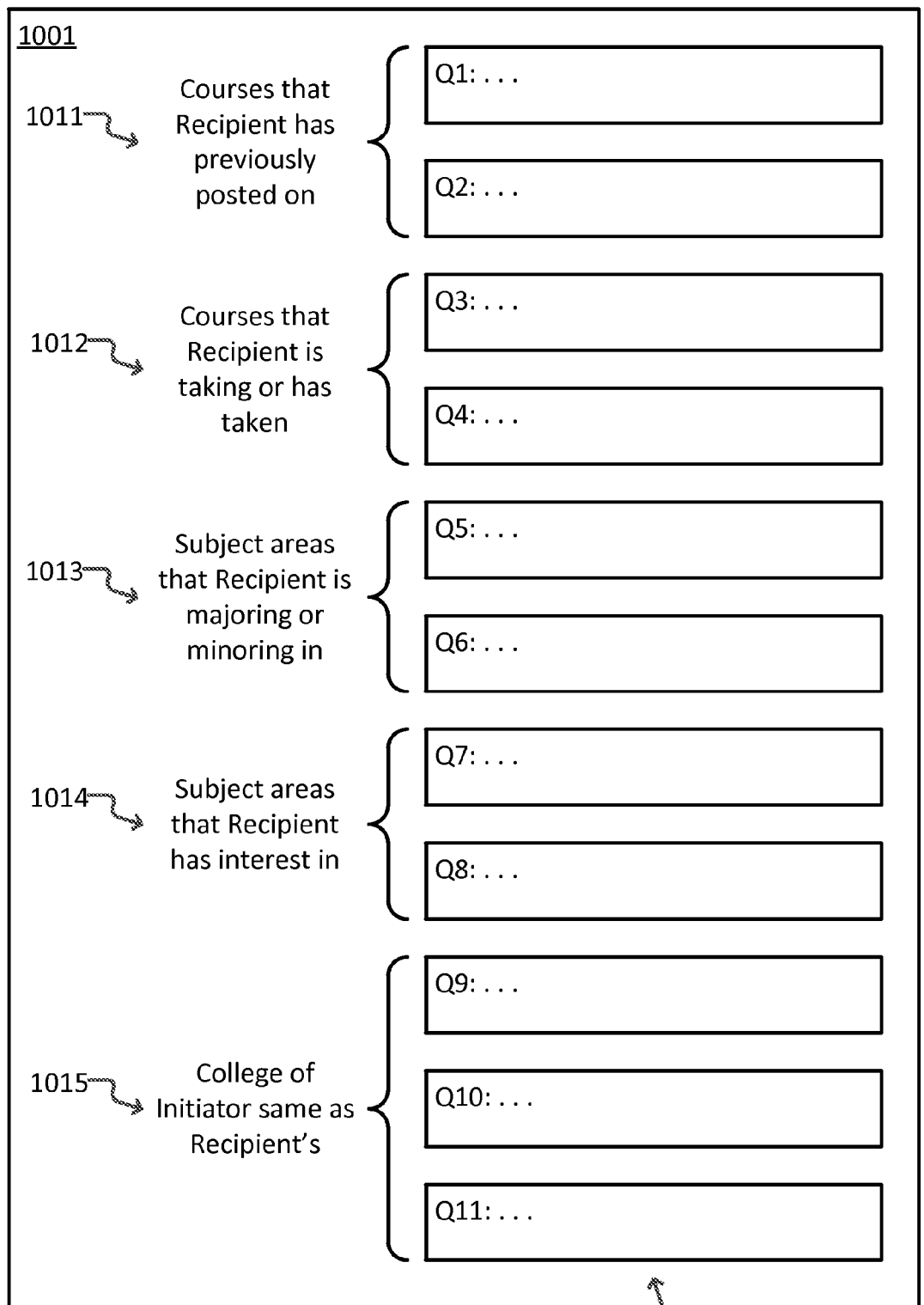
FIGS. 10A and 10B illustrate examples of postings displayed by an intra-affiliation and inter-affiliation posting manager.
Figure 10B:
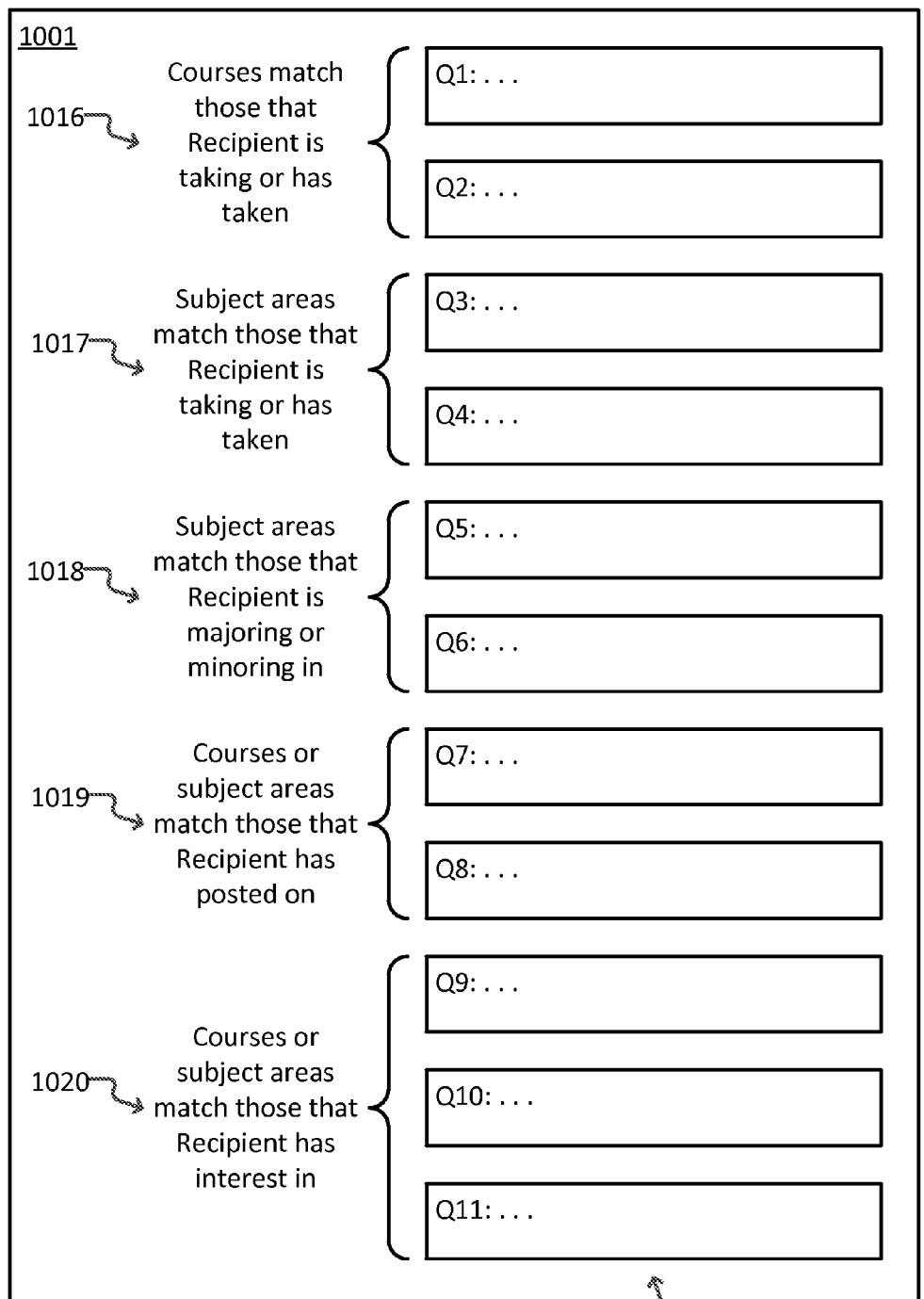

FIGS. 10A and 10B illustrate examples of postings displayed by an intra-affiliation and inter-affiliation posting manager. As shown in FIG. 10A, display or screen 1001 may include postings 1021 that are ordered according to factors 1011-1015. Here, screen 1001 may display or present postings 1021 to a recipient. Postings 1021 may be, for example, questions posted on an academic forum. In some examples, postings 1021 may be a set of intra-affiliation postings, which may be associated with a set of affiliation-specific parameters. In some examples, a same set of affiliation-specific parameters may be used in a set of intra-affiliation communications, and mapping of affiliation-specific parameters may be unnecessary for an evaluation of affiliation-specific parameters. In other examples, mapping of affiliation-specific parameters to intermediate parameters, or other operations may be performed.

The order of postings 1021 may be determined based on a level of relevancy of each of the postings 1021, which may be determined based on postings data, initiator data, recipient data, and other data, as described above. For example, more relevant postings may be displayed first. Referring to the first factor 1011, the first subset of postings may be associated with courses on which a recipient has previously posted. For example, based on a match between a course of a posting and a course associated with account activity of a recipient, a level of relevancy has been determined for the posting, placing the posting at or near the top of an order of postings. In other examples, postings associated with factors 1012-1015 may be ordered. For example, postings that are on courses that the recipient is taking or has taken may be next. In other examples, postings 1021 may be ordered differently, based on different weights associated with different data evaluations. For example, not all postings that are on a course that a recipient has previously posted on may be at the top of a list displayed on screen 1001. Other factors may lower the relevancy of some of these postings. For example, a posting may be on a course that the recipient has previously posted on, but the initiator majors in a different subject area than the recipient. A comparison of subject areas may affect the relevancy determination, and push this posting lower on an order of postings. Weights, data evaluations, or relevancy determinations may be customized. In other examples, other factors may be included.

As shown in FIG. 10B, display or screen 1001 may include postings 1022 that are ordered according to factors 1016-1020. Here, postings 1022 may be a set of inter-affiliation postings, which may be associated with different sets of affiliation-specific parameters associated with different affiliations. For example, based on relevancy determinations, referring to the first factor 1016, the first subset of postings may be associated with courses that are equivalent to those the recipient is taking or has taken. Equivalency may be determined based on mappings of affiliation-specific parameters. For example, if two affiliation-specific parameters map to the same intermediate parameter, a match may be found, and a weight may be determined. Subsequently, postings associated with factors 1017-1020 may be ordered. For example, postings on subject areas substantially equivalent to those the recipient is taking or has taken may be next, following the first subset of postings. As described above, other orders may be determined, and other factors may be used. For example, not all postings that are on courses that are substantially equivalent to those the recipient is taking or has taken may be ordered first.

In some examples, intra-affiliation and inter-affiliation postings may be displayed together or substantially simultaneously on a screen. An order of intra-affiliation and inter-affiliation postings may be determined based on a level of relevancy of each posting to the recipient. An affiliation associated with a posting or an initiator may be an input to the relevancy determination, but other inputs may be considered. For example, if a posting and a recipient are associated with the same affiliation (e.g., attend the same college), this may increase the relevancy of a posting. However, other data (e.g., courses, subject areas, dates, etc., associated with the posting, the initiator, and/or the recipient) may affect the final relevancy determination. Thus, in some examples, postings associated with the affiliation of a recipient may be ordered first, while in other examples, such postings may be dispersed throughout other postings.

Figure 11:
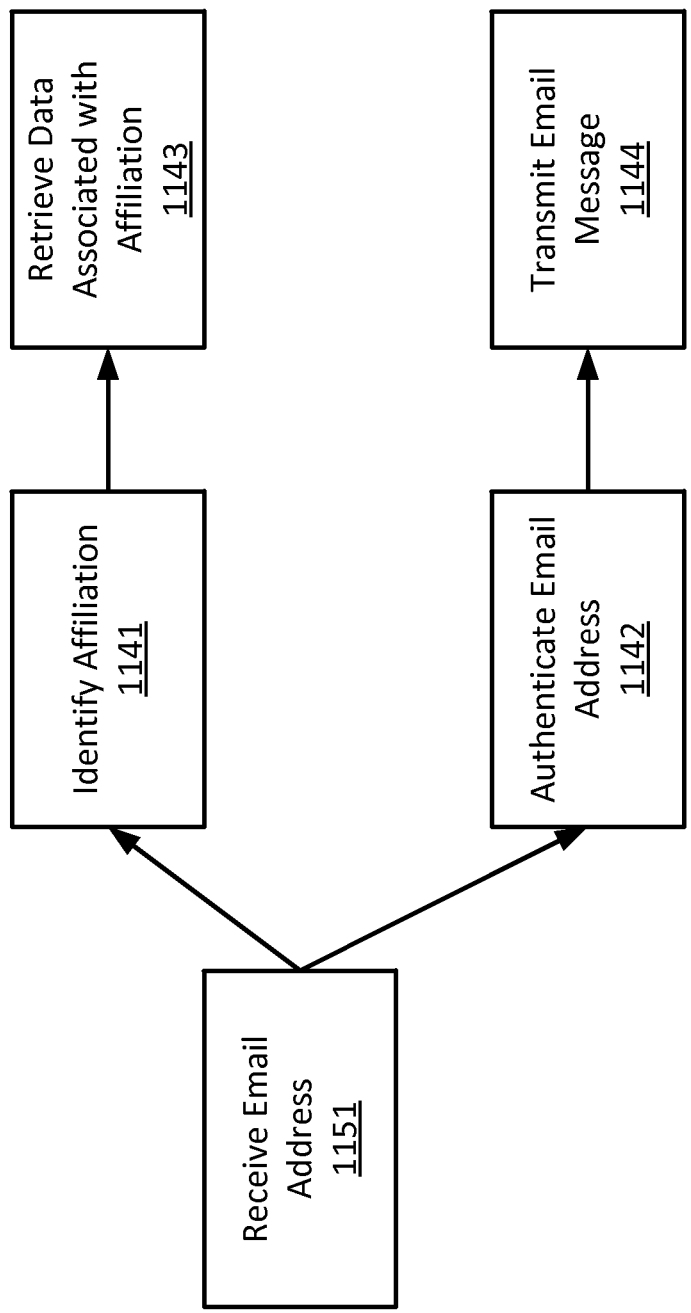
FIG. 11 illustrates an identification and authentication process performed by a registration module of an intra-affiliation and inter-affiliation posting manager.

FIG. 11 illustrates an identification and authentication process performed by a registration module of an intra-affiliation and inter-affiliation posting manager. As shown, FIG. 11 depicts receiving an email address 1151, and performing both an identification 1141 and an authentication 1142 using an email address. Identifying an affiliation 1141 may include comparing an email address, or a portion thereof, to a library (e.g., table, pointers, database, etc.). In some examples, a library may include an association between a portion of an email address (e.g., a domain name) and an affiliation. For example, a domain name "@cornell.edu" may be associated with "Cornell University." If a portion of an email address matches an entry in the library, the entry may be used to identify an affiliation associated with an email address. A match may be determined if the data are the same or substantially similar. In some examples, if an email address received is substantially similar to an entry in a library, or is not found in a library, a posting manager may prompt a user to review an email address and verify the accuracy of such. After an affiliation is identified, data associated with the affiliation may be retrieved 1143 from a data repository coupled to a posting manager, and may be transmitted to the user. For example, a list of affiliation-specific parameters associated with the affiliation may be transmitted. As another example, relevancy of postings to a user may be determined based on an identified affiliation, and relevant postings may be transmitted. In addition, authenticating an email address 1142 may include transmitting a message or other data 1144 to an email address, and the message may include data configured to authenticate an email address. The data may include a URL or link that a user may access or follow in order to indicate receipt of an email message or otherwise authenticate an email address. After authentication, the account may become authenticated, and an authenticated account may be used to make postings using an intra-affiliation and inter-affiliation posting manager. In other examples, numerous authenticated accounts may make postings managed by a posting manager.

Figure 12:
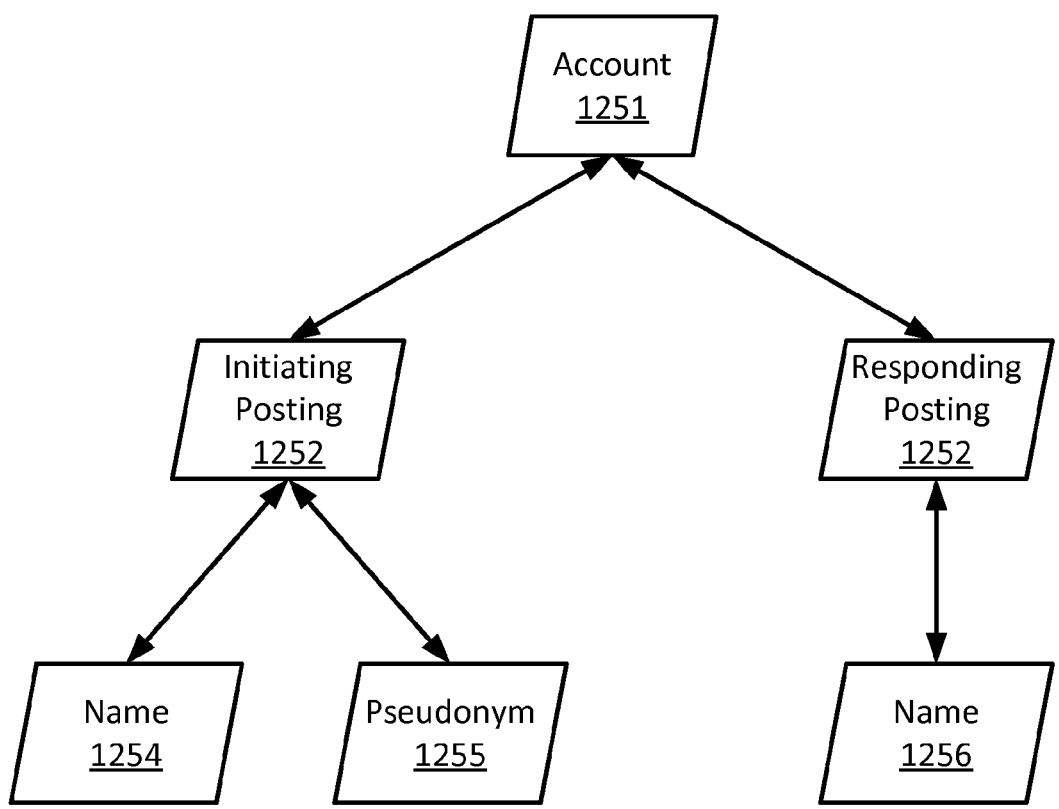
FIG. 12 illustrates examples of identification tags associated with posting types displayed by a posting display module of an intra-affiliation and inter-affiliation posting manager.

FIG. 12 illustrates examples of identification tags associated with posting types displayed by a posting display module of an intra-affiliation and inter-affiliation posting manager. As shown, FIG. 12 depicts an account 1251, which may be associated with posting types such as an initiating posting 1252 and a responding posting 1253, which may be associated with identification tags 1254-1256. Account 1251 may include one or more identification tags, such as a name, a pseudonym, or the like (e.g., user characteristics 353 of FIG. 3). In some examples, an identification tag may be a word, name, label, phrase, title, description, biography, or term that refers to a user of account 1251. In other examples, an identification tag may be a name of a user (e.g., first name, last name, etc.). In still other examples, an identification tag may be a pseudonym of a user (e.g., a nickname, a label that provides anonymity to a user, etc.). A pseudonym may be the same as or similar to a username, entered by a user, assigned by a posting manager, or otherwise determined. In yet other examples, other identification tags may be used differently.

In some examples, an identification tag may be used to provide an attribution to the poster of a posting, or an identification tag may be displayed with a posting. A subset of identification tags may be associated with a subset of posting types, while another subset of identification tags may be associated with another subset of posting types. A posting type may be associated with a posting, and may be a characteristic or description of a posting. Examples of posting types include initiating posting 1252 and responding posting 1253. In some examples, initiating posting 1252 may be a posting that initiates a new thread or conversation. In other examples, initiating posting 1252 may be a posting that is not responding to another posting. In still other examples, initiating posting 1252 may be transmitted to a receiving account with an option to respond to initiating posting 1252. In some examples, responding posting 1253 may be a posting that responds to initiating posting 1252. In other examples, responding 1253 may be a posting that is stored or displayed in the same thread or conversation as initiating posting 1252.

As described above, a subset of identification tags may be associated with a subset of posting types. For example, a posting type may permit the user to select a subset of identification tags, while another posting type may permit the user to select another subset of identification tags. As another example, a posting type may automatically or by default use one identification tag, while another posting type may automatically or by default use another identification tag. As shown, for example, if account 1251 enters initiating posting 1252, account 1251 may be provided an option to use name 1254 or pseudonym 1255. Initiating posting 1252 may be displayed to a recipient with an identification tag selected by a poster (e.g., a selected identification tag). As another example, if account 1251 enters responding posting 1253, account 1251 may be provided with the option to use name 1256 only. Responding posting 1253 may be displayed with name 1256. In still other examples, one or more identification tags may be used or displayed with a posting type, or no identification tags may be used or displayed with a posting type. Hence, one account may be associated with one or more identification tags, and one or more identification tags may be used or displayed with a posting based on the posting type of the posting.

In some examples, a subset of posting types may be associated with a subset of account types, while another subset of posting types may be associated with another subset of account types. An account type may be associated with account 1251, and may be a characteristic or description of an account. For example, an account may be restricted to make postings of a given posting type, but not others. A posting type selected may then be used to restrict identification tags that may be selected for a posting. Examples of account types include mentor account and mentee account. For example, mentor and mentee accounts may be used in an educational or academic forum where users ask and answer questions from each other, or otherwise respond to comments from each other. For example, a mentee account may be permitted to post initiating postings only. For example, a mentor account may be permitted to post responding postings only, or may be permitted to post both responding postings and initiating postings. Still, other permissions and restrictions may be used with posting types and account types.

Figure 13A:
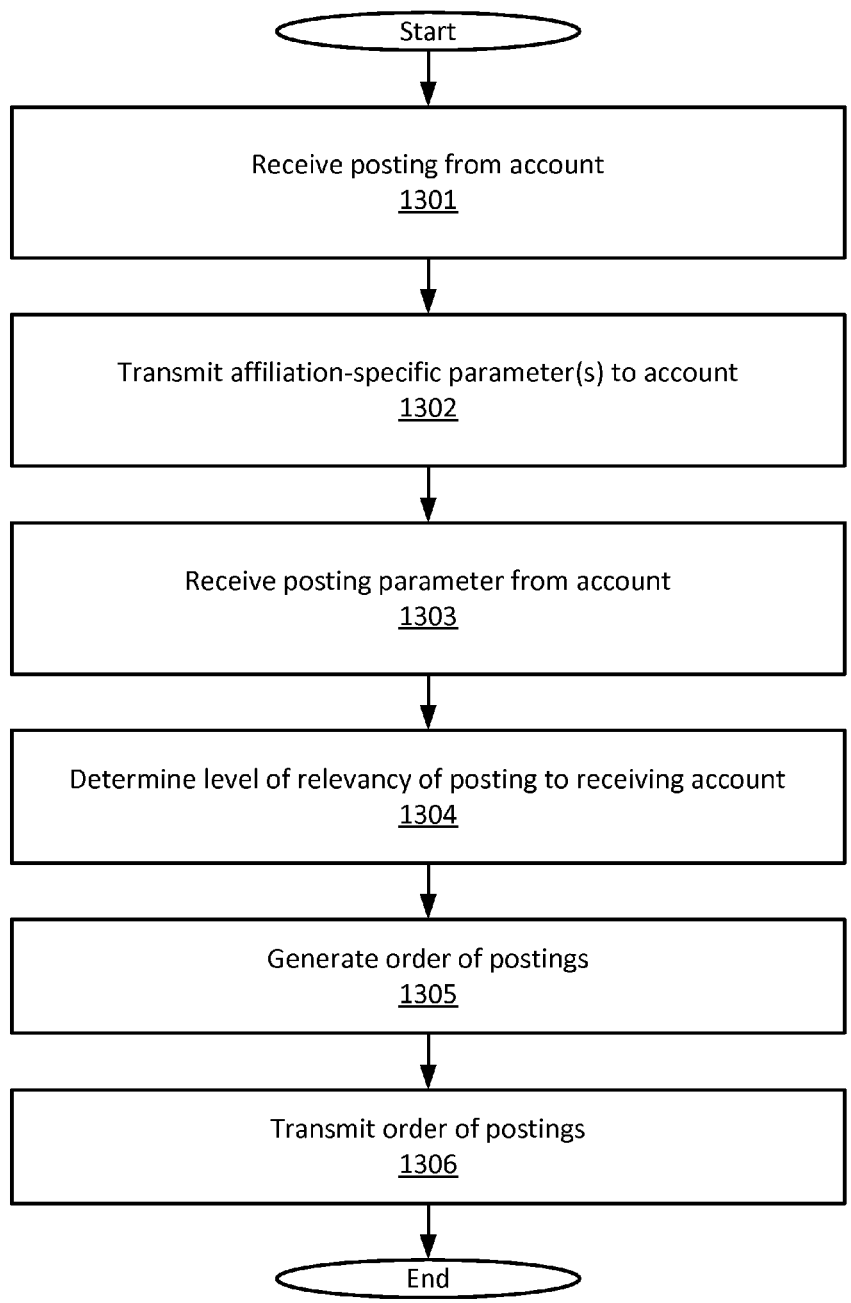
FIG. 13A illustrates an example of a flowchart for implementing a posting ordering module of an intra-affiliation and inter-affiliation posting manager.

FIG. 13A illustrates an example of a flowchart for implementing a posting ordering module of an intra-affiliation and inter-affiliation posting manager. At 1301, a posting is received from an account. An account may be associated with an affiliation and an account parameter. For example, an account parameter may be a user characteristic, which may be an affiliation-specific parameter. At 1302, one or more affiliation-specific parameters associated with an affiliation of an account may be transmitted to the account. For example, one or more affiliation-specific parameters may be predetermined by a posting manager. One or more affiliation-specific parameters may be obtained from an affiliation and loaded into a data repository of a posting manager. Other affiliation-specific parameters associated with other affiliations may also be stored in a data repository of a posting manager. A prompt may be provided to request an account to select a posting parameter from one or more affiliation-specific parameters associated with an affiliation of an account. At 1303, a posting parameter may be received from an account. In some examples, a posting parameter may be selected from one or more affiliation-specific parameters associated with an affiliation of an account. At 1304, a level of relevancy of a posting to a receiving account is determined based on a posting parameter, an account parameter, and a receiving account parameter. A receiving account may be associated with a receiving account parameter. For example, a receiving account parameter may be a user characteristic of a receiving account, which may be an affiliation-specific parameter. For example, a variety of comparisons of a posting parameter, an account parameter, and a receiving account parameter may be made, and a level of relevancy may be determined based on matches or results from the comparisons. At 1305, an order of postings may be generated based on a level of relevancy of one or more postings. For example, one or more postings may be transmitted and displayed to a receiving account. One or more postings may be ordered based on a relevancy of each posting. A more relevant posting may be ordered before a less relevant posting. In some examples, a more relevant posting may be a posting that has a higher relevancy score. In other examples, a more relevant posting may be a posting that has a combination of weights that is greater than another posting. At 1306, an order of postings may be transmitted to a receiving account. For example, one or more postings may be displayed to a receiving account based on an order of postings. Still, other implementations may be used.

Figure 13B:
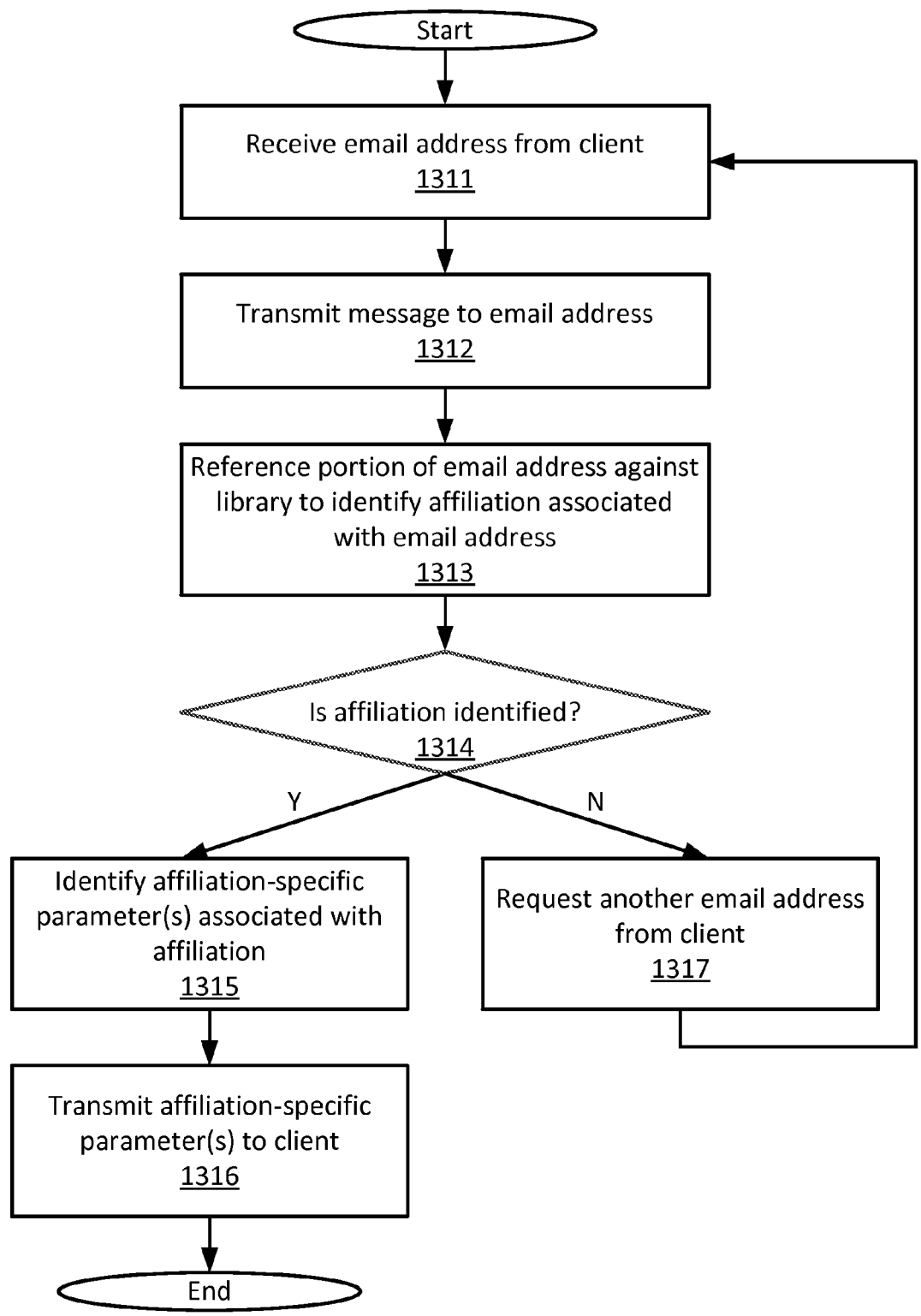
FIG. 13B illustrates an example of a flowchart for implementing a registration module of an intra-affiliation and inter-affiliation posting manager.

FIG. 13B illustrates an example of a flowchart for implementing a registration module of an intra-affiliation and inter-affiliation posting manager. At 1311, an email address may be received from a client. For example, an email address may be entered by a user through a client interface, and transmitted over a network to a posting manager. At 1312, a message (e.g., an email message) may be transmitted to an email address, and in some examples, a message (e.g., an email message) may include data configured to authenticate an email address. For example, an email message may include a URL or link that may be accessed to authenticate an email address. At 1313, an email address, or a portion thereof, may be referenced against a library to identify an affiliation associated with an email address. For example, a library may include pairs of domain names and affiliations. A library may be stored in one or more data repositories, local or remote to a posting manager. At 1314, an inquiry is made determining whether an affiliation has been identified. If no, at 1317, a request for another email address from a client may be transmitted, and another email address may be received at 1311. If yes, at 1315, one or more affiliation-specific parameters associated with an affiliation may be identified. For example, affiliation-specific parameters and associated affiliations may be stored in one or more data repositories, local or remote to a posting manager. In some examples, affiliation-specific parameters may be predetermined by the posting manager. In other examples, affiliation-specific parameters may be obtained from an affiliation. At 1316, one or more affiliation-specific parameters may be transmitted to a client. For example, a prompt may be transmitted to a client to enter user characteristics by making a selection from one or more affiliation-specific parameters. As an example, one or more affiliation-specific parameters may be presented as a dropdown menu, auto-completion textbox, in the form of checkboxes, or other formats. Still, other implementations may be used.

Figure 13C:
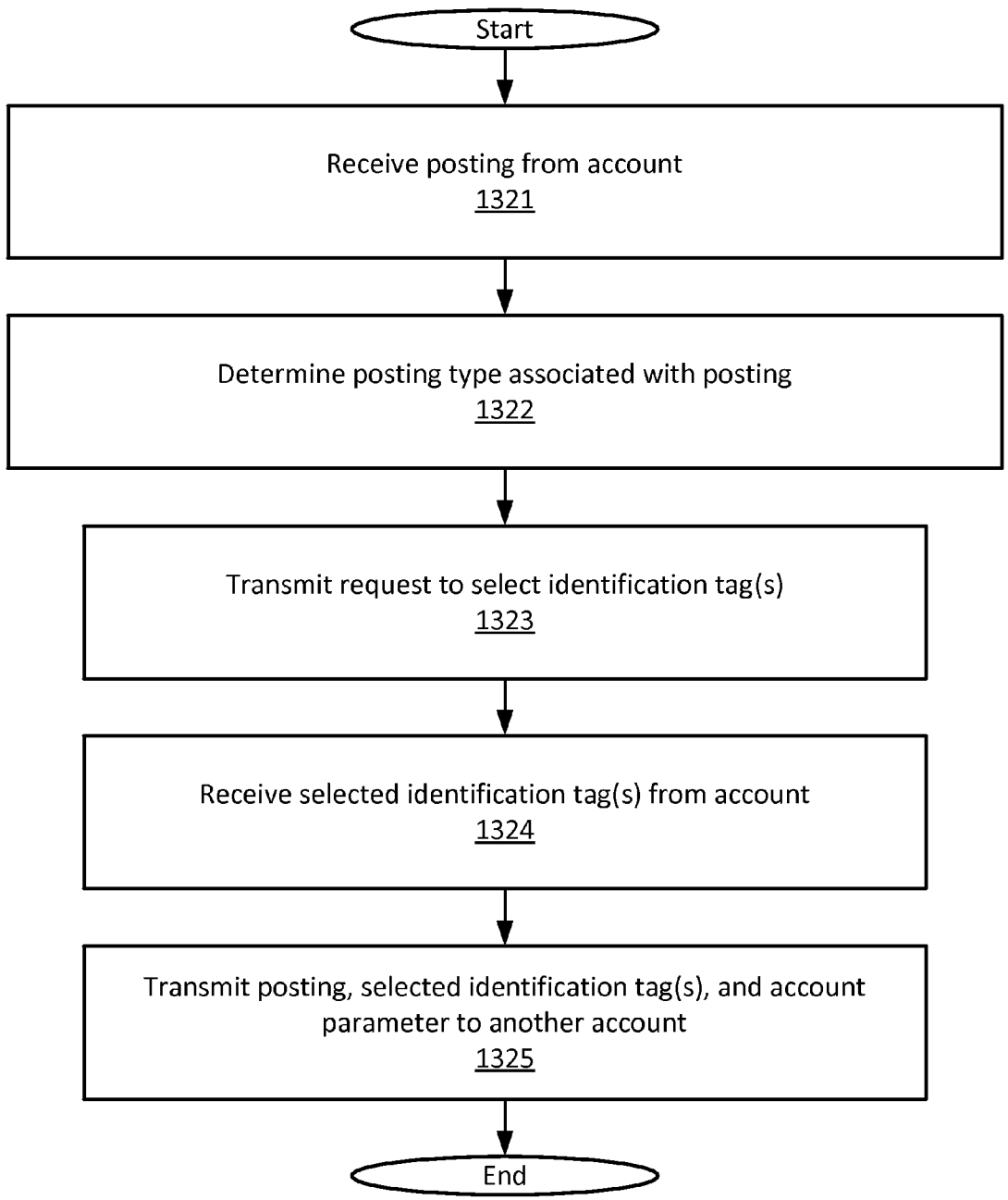
FIG. 13C illustrates an example of a flowchart for implementing a posting display module of an intra-affiliation and inter-affiliation posting manager.

FIG. 13C illustrates an example of a flowchart for implementing a posting display module of an intra-affiliation and inter-affiliation posting manager. At 1321, a posting may be received from an account. In some examples, an account may be associated with one or more identification tags (e.g., a name, a pseudonym, etc.) and an account parameter selected from one or more affiliation-specific parameters. Affiliation-specific parameters may be provided to an account by a posting manager (e.g., as a dropdown menu, checkbox, list, auto-complete textbox, etc.). At 1322, a posting type associated with a posting may be determined. In some examples, a posting type may be associated with transmitting a request to select an identification tag from at least a subset of one or more identification tags associated with an account. For example, a posting type may be manually selected or may be automatically determined, for example, by a posting manager. For example, a posting that initiates a thread or does not respond to another posting may be determined to be an initiating type. A posting that responds to another posting may be determined to be a responding type. For example, a posting type may be associated with a request to select from one subset of identification tags, while another posting type may be associated with a request to select from another subset of identification tags. At 1323, a request to select an identification tag may be transmitted to the account. At 1324, an identification tag selected in response to a request (e.g., a selected identification tag) may be received from an account. At 1325, a posting, a selected identification tag, and an account parameter may be transmitted to another account. A posting may be displayed at another account using or with a selected identification tag and an account parameter. A selected identification tag and an account parameter may facilitate attribution of a posting to a poster. Still, other implementations may be used.

Figure 14:
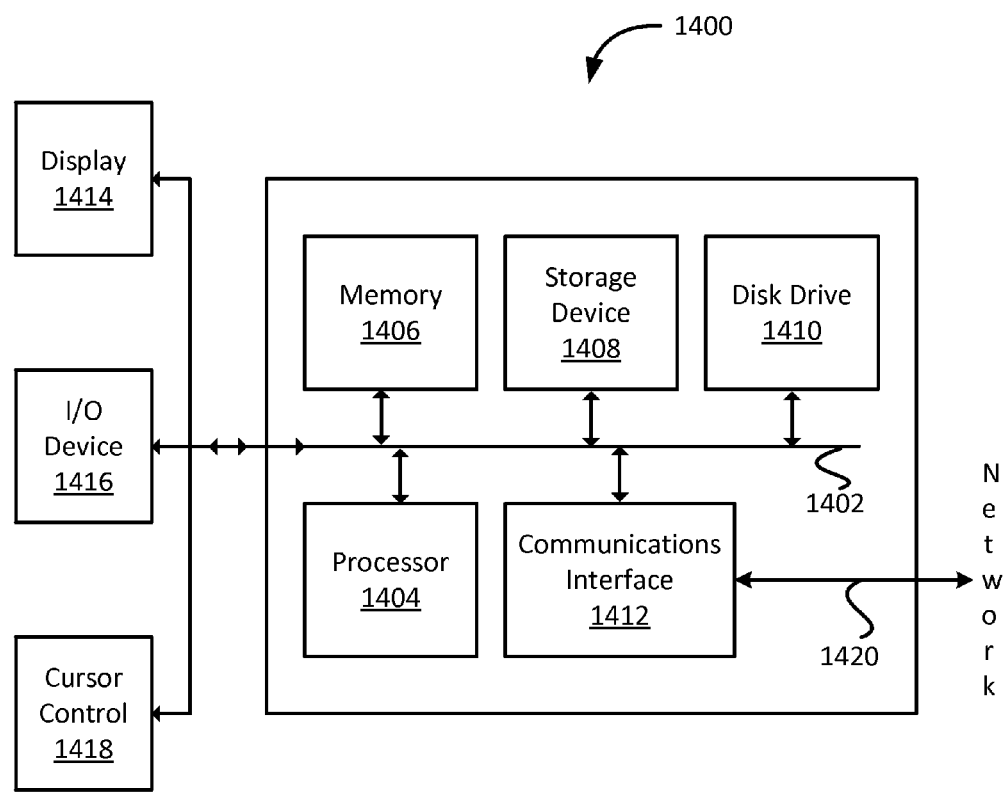
FIG. 14 illustrates a computer system suitable for use with an intra-affiliation and inter-affiliation posting manager.

FIG. 14 illustrates a computer system suitable for use with an intra-affiliation and inter-affiliation posting manager. In some examples, computer system 1400 may be used to implement computer programs, applications, methods, or other software to perform the above-described techniques such as those described above. Computer system 1400 includes a bus 1402 or other communication mechanism for communicating information, which interconnects subsystems and devices, such as processor 1404, system memory 1406 (e.g., RAM, or the like), storage device 1408 (e.g., ROM, or the like), disk drive 1410 (e.g., magnetic, optical, or the like), communication interface 1412 (e.g., modem, Ethernet card, or the like), display 1414 (e.g., CRT, LCD, or the like), input device 1416 (e.g., keyboard, or others), and cursor control 1418 (e.g., mouse, trackball, or the like).

In some examples, computer system 1400 performs specific operations by processor 1404 executing one or more sequences of one or more instructions stored in system memory 1406. Such instructions may be read into system memory 1406 from another computer readable medium, such as static storage device 1408 or disk drive 1410. In other examples, hard-wired circuitry may be used in place of or in combination with software instructions to implement the invention.

The term "computer readable medium" refers to any medium that participates in providing instructions to processor 1404 for execution. Such a medium may take many forms, including but not limited to, non-volatile media, volatile media, and transmission media. Non-volatile media includes, for example, optical or magnetic disks, such as disk drive 1410. Volatile media includes dynamic memory, such as system memory 1406. Transmission media includes coaxial cables, copper wire, and fiber optics, including wires that include bus 1402. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 1400. Two or more computer systems 1400 coupled by communication link 1420 (e.g., LAN, PSTN, wireless network, or the like) may perform the sequence of instructions in coordination with one another. Computer system 1400 may transmit and receive messages, data, and instructions, including program (i.e., application code) through communication link 1420 and communication interface 1412. Received program code may be executed by processor 1404 as it is received, and/or stored in disk drive 1410, or other non-volatile storage for later execution.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A non-transitory computer readable medium comprising instructions, which when executed by one or more hardware processors, cause performance of operations comprising:
   presenting an interface that requests an email address of a first user, without requesting a first affiliation of the user;
   receiving the email address entered via the interface by the first user;
   identifying a domain name corresponding to the email address;
   identifying a library storing associations between (a) a plurality of domain names and (b) a plurality of affiliations, wherein the plurality of domain names comprises the domain name corresponding to the email address, and the plurality of affiliations comprises the first affiliation and a second affiliation;
   determining that the domain name corresponding to the email address is associated with the first affiliation based on the library storing associations between (a) the plurality of domain names and (b) the plurality of affiliations;
   receiving a first affiliation-specific parameter, associated with the first affiliation, entered by the first user;
   determining a level of confidence associated with at least one of: (a) a first mapping between the first affiliation-specific parameter and an intermediate parameter, and (b) a second mapping between the first affiliation-specific parameter and a second affiliation-specific parameter associated with the second affiliation;
   determining a level of relevancy of a posting, entered by the first user, to a second user that is associated with the second affiliation based at least on the level of confidence;
   determining to transmit the posting to the second user based at least on the level of relevancy of the posting to the second user; and
   transmitting the posting to the second user.

2. The medium of claim 1, wherein the operations further comprise:
   identifying a set of one or more affiliation-specific parameters associated with the first affiliation; and
   causing display of the set of affiliation-specific parameters at the interface.

3. The medium of claim 2, wherein the operations further comprise:
   receiving a selection of a particular affiliation-specific parameter, from the set of affiliation-specific parameters, via the interface by the first user; and
   storing the particular affiliation-specific parameter in association with a user account associated with the first user.

4. The medium of claim 1, wherein the operations further comprise:
   transmitting an affiliation-specific parameter, associated with the first affiliation, to a client device associated with the first user.

5. The medium of claim 1, wherein the first affiliation comprises at least one of: a school, a college, a university, a company, an organization, a club, a league, or a team.

6. The medium of claim 1, wherein the first affiliation is identified as being associated with the user without the user entering a name of the first affiliation via the interface.

7. The medium of claim 1, wherein the email address is received as part of a user registration process.

8. The medium of claim 1, wherein the operations further comprise: generating a user account for the user.

9. The medium of claim 1, wherein the operations further comprise: receiving a posting from the user.

10. The medium of claim 1, wherein the operations further comprise:
determining a second level of relevancy of a second posting, entered by a third user, to the first user based at least on the first affiliation associated with the first user; and
causing display of the second posting based on the level of relevancy at the interface.

11. The medium of claim 1, wherein the operations further comprise: transmitting an email message to the email address, the email message including data configured to authenticate the email address.

12. A method, comprising:
presenting an interface that requests an email address of a first user, without requesting a first affiliation of the first user;
receiving the email address entered via the interface by the first user;
identifying a domain name corresponding to the email address;
identifying a library storing associations between (a) a plurality of domain names and (b) a plurality of affiliations, wherein the plurality of domain names comprises the domain name corresponding to the email address, and the plurality of affiliations comprises the first affiliation and a second affiliation;
determining that the domain name corresponding to the email address is associated with the first affiliation based on the library storing associations between (a) the plurality of domain names and (b) the plurality of affiliations;
receiving a first affiliation-specific parameter, associated with the first affiliation, entered by the first user;
determining a level of confidence associated with at least one of: (a) a first mapping between the first affiliation-specific parameter and an intermediate parameter, and (b) a second mapping between the first affiliation-specific parameter and a second affiliation-specific parameter associated with the second affiliation;
determining a level of relevancy of a posting, entered by the first user, to a second user that is associated with the second affiliation based at least on the level of confidence;
determining to transmit the posting to the second user based at least on the level of relevancy of the posting to the second user; and
transmitting the posting to the second user.

13. The method of claim 12, further comprising:
identifying a set of one or more affiliation-specific parameters associated with the first affiliation; and
causing display of the set of affiliation-specific parameters at the interface.

14. The method of claim 13, further comprising:
receiving a selection of a particular affiliation-specific parameter, from the set of affiliation-specific parameters, via the interface by the first user; and
storing the particular affiliation-specific parameter in association with a user account associated with the first user.

15. The method of claim 12, further comprising:
transmitting an affiliation-specific parameter, associated with the first affiliation, to a client device associated with the first user.

16. A system, comprising:
at least one device including a hardware processor; and
the system being configured to perform operations comprising:
presenting an interface that requests an email address of a first user, without requesting a first affiliation of the first user;
receiving the email address entered via the interface by the first user;
identifying a domain name corresponding to the email address;
identifying a library storing associations between (a) a plurality of domain names and (b) a plurality of affiliations, wherein the plurality of domain names comprises the domain name corresponding to the email address, and the plurality of affiliations comprises the first affiliation and a second affiliation;
determining that the domain name corresponding to the email address is associated with the first affiliation based on the library storing associations between (a) the plurality of domain names and (b) the plurality of affiliations;
receiving a first affiliation-specific parameter, associated with the first affiliation, entered by the first user;
determining a level of confidence associated with at least one of: (a) a first mapping between the first affiliation-specific parameter and an intermediate parameter, and (b) a second mapping between the first affiliation-specific parameter and a second affiliation-specific parameter associated with the second affiliation;
determining a level of relevancy of a posting, entered by the first user, to a second user that is associated with the second affiliation based at least on the level of confidence;
determining to transmit the posting to the second user based at least on the level of relevancy of the posting to the second user; and
transmitting the posting to the second user.

17. The system of claim 16, wherein the operations further comprise:
identifying a set of one or more affiliation-specific parameters associated with the first affiliation; and
causing display of the set of affiliation-specific parameters at the interface.

18. The system of claim 17, wherein the operations further comprise:
receiving a selection of a particular affiliation-specific parameter, from the set of affiliation-specific parameters, via the interface by the first user; and
storing the particular affiliation-specific parameter in association with a user account associated with the first user.

19. The system of claim 16, wherein the operations further comprise:
transmitting an affiliation-specific parameter, associated with the first affiliation, to a client device associated with the first user.

* * * * *